(12) United States Patent
Nakagawa

(10) Patent No.: US 11,079,982 B2
(45) Date of Patent: Aug. 3, 2021

(54) IMAGE FORMING APPARATUS, RECORDING MEDIUM, AND CONTROL METHOD FOR VISUALLY DISPLAYING UNRESOLVED ERRORS

(71) Applicant: SHARP KABUSHIKI KAISHA, Sakai (JP)

(72) Inventor: Kanji Nakagawa, Sakai (JP)

(73) Assignee: SHARP KABUSHIKI KAISHA, Osaka (JP)

(*) Notice: Subject to any disclaimer, the term of this patent is extended or adjusted under 35 U.S.C. 154(b) by 0 days.

(21) Appl. No.: 16/860,980

(22) Filed: Apr. 28, 2020

(65) Prior Publication Data

US 2020/0356322 A1 Nov. 12, 2020

(30) Foreign Application Priority Data

May 7, 2019 (JP) ............................. JP2019-087543

(51) Int. Cl.
*G06F 3/12* (2006.01)
*H04N 1/32* (2006.01)
*G06K 15/00* (2006.01)
*H04N 1/00* (2006.01)

(52) U.S. Cl.
CPC ............ *G06F 3/1235* (2013.01); *G06F 3/121* (2013.01); *G06F 3/1234* (2013.01); *G06K 15/4075* (2013.01); *H04N 1/00408* (2013.01); *H04N 1/3263* (2013.01); *H04N 1/32609* (2013.01); *H04N 1/32625* (2013.01); *H04N 1/32635* (2013.01); *H04N 1/32651* (2013.01); *H04N 1/32694* (2013.01); *H04N 1/00002* (2013.01); *H04N 1/00477* (2013.01); *H04N 1/32657* (2013.01)

(58) Field of Classification Search
None
See application file for complete search history.

(56) References Cited

U.S. PATENT DOCUMENTS

| | | | |
|---|---|---|---|
| 2011/0069340 A1* | 3/2011 | Asai ................... | G03G 15/5079 358/1.15 |
| 2013/0074008 A1* | 3/2013 | Umezawa .......... | H04N 1/00413 715/810 |
| 2015/0046879 A1* | 2/2015 | Orimoto .............. | G06K 15/005 715/835 |
| 2016/0050307 A1 | 2/2016 | Yan et al. | |
| 2018/0004367 A1* | 1/2018 | Sento .................. | G06F 3/04817 |
| 2020/0204512 A1* | 6/2020 | Ido ...................... | H04M 3/4872 |
| 2020/0244826 A1* | 7/2020 | Ido ..................... | H04N 1/00129 |

FOREIGN PATENT DOCUMENTS

JP 2016-535366 A 11/2016

* cited by examiner

*Primary Examiner* — Miya J Williams
(74) *Attorney, Agent, or Firm* — ScienBiziP, P.C.

(57) ABSTRACT

An image forming apparatus includes a CPU. When an error occurs, the CPU notifies a user or the like of the error and adds information about the error to an error table. When the error is resolved, the CPU deletes the information about the resolved error from the error table. The CPU refers to the error table and displays, on a display, a home screen in which a badge indicating the number of unresolved errors in each operation mode is displayed. When a mode selection button on which the badge is displayed is touched, the CPU re-notifies the user of the unresolved errors.

9 Claims, 23 Drawing Sheets

FIG. 7

NOTIFICATION TABLE 200

| NOTIFICATION ID | ERROR | ERROR MESSAGE NOTIFICATION METHOD | RESOLUTION MESSAGE NOTIFICATION METHOD |
|---|---|---|---|
| 1 | REPLACEMENT OF Y TONER | AUDIO / SCREEN DISPLAY | AUDIO / SCREEN DISPLAY |
| 2 | OUT OF PAPER IN PAPER TRAY 1 | AUDIO / SCREEN DISPLAY | AUDIO / SCREEN DISPLAY |
| 3 | FAX TRANSMISSION FAILURE | AUDIO / SCREEN DISPLAY | NO NOTIFICATION |
| ⋮ | ⋮ | ⋮ | ⋮ |

FIG. 8

ERROR TABLE 220

| ERROR ID | OPERATION MODE | JOB | ERROR |
|---|---|---|---|
| A | COPY | PRINT | OUT OF PAPER IN PAPER TRAY 1 |
| B | COPY | PRINT | REPLACEMENT OF Y TONER |
| ⋮ | ⋮ | ⋮ | ⋮ |

FIG. 23

NOTIFICATION TABLE 200

| NOTIFICATION ID | ERROR CONTENT | ERROR STATUS | ERROR MESSAGE NOTIFICATION METHOD | RESOLUTION MESSAGE NOTIFICATION METHOD |
|---|---|---|---|---|
| 1 | REPLACEMENT OF Y TONER | UNRESOLVED FIRST PHASE | AUDIO / SCREEN DISPLAY | NO NOTIFICATION |
| | | UNRESOLVED SECOND PHASE | AUDIO / SCREEN DISPLAY | AUDIO / SCREEN DISPLAY |
| 2 | OUT OF PAPER IN PAPER TRAY 1 | UNRESOLVED | AUDIO / SCREEN DISPLAY | AUDIO / SCREEN DISPLAY |
| 3 | UNABLE TO TRANSMIT FAX | UNRESOLVED | AUDIO / SCREEN DISPLAY | NO NOTIFICATION |
| ⋮ | ⋮ | ⋮ | ⋮ | ⋮ |

FIG. 24

ERROR TABLE 220

| ERROR ID | OPERATION MODE | JOB | ERROR | ERROR STATUS |
|---|---|---|---|---|
| A | COPY | PRINT | OUT OF PAPER IN PAPER TRAY 1 | UNRESOLVED |
| B | COPY | PRINT | REPLACEMENT OF Y TONER | UNRESOLVED FIRST PHASE |
| ⋮ | ⋮ | ⋮ | ⋮ | ⋮ |

# IMAGE FORMING APPARATUS, RECORDING MEDIUM, AND CONTROL METHOD FOR VISUALLY DISPLAYING UNRESOLVED ERRORS

BACKGROUND OF THE INVENTION

Field of the Invention

The present invention relates to an image forming apparatus, a recording medium storing a control program, and a control method, and more particularly to, for example, an image forming apparatus, a recording medium storing an information processing program, and an information processing method that allow a number of unresolved errors to be visually displayed.

Description of the Background Art

An example of this kind of background art is disclosed in Japanese Translation of PCT International Application Publication No. JP-T-2016-535366. In the disclosed hardware device, when receiving an unread message, an application transmits a notification message notifying that the unread message has been received, to a notification bar that displays the notification message. Upon receipt of the notification message, the notification bar identifies the number of unread messages received by the application on the basis of the number of notification messages, and updates the value of a badge added to the application. In addition, when it is detected that the unread message has been read, the number of unread messages that have been read is subtracted from the value of the badge of the application corresponding to the notification message, and the value of the badge is updated with the value after the subtraction and displayed.

In a general image forming apparatus, when an error such as a paper-out or paper jam occurs, a user is notified of the occurrence of the error. Specifically, a warning tone notifying that the error has occurred is output or an error message is displayed on a display. In the general image forming apparatus, even if it is detected that the error message has been read, the error generated in the image forming apparatus may not have been resolved. Therefore, for an error that is not resolved by just being read, it is not appropriate to prevent an error message from being redisplayed before the error is resolved. In order to avoid this, it is conceivable to keep displaying the error message on an operation panel until the error is resolved, but in this case, the operation using the operation panel may not be possible. Thus, use of functions not related to the error occurrence is also restricted, which is inconvenient.

For this reason, as disclosed in Japanese Translation of PCT International Application Publication No. JP-T-2016-535366, it is conceivable to display the number of unread messages in a badge so that the functions not related to the error occurrence can be used. However, as described above, in the image forming apparatus, the error may not be resolved only by reading the error message, and thus the technique of Japanese Translation of PCT International Application Publication No. JP-T-2016-535366 cannot be applied as it is.

Therefore, a main object of the present invention is to provide a novel image forming apparatus, a novel recording medium storing a control program, and a novel control method.

Another object of the present invention is to provide an image forming apparatus, a recording medium storing a control program, and a control method that allow a user to easily recognize that there is an unresolved error.

SUMMARY OF THE INVENTION

A first aspect of the present invention is an image forming apparatus including an error information storage that stores, in a memory, error information on an error that has occurred, a notifier that notifies an error message corresponding to the error, a determiner that determines whether the error has been resolved, an error information deleter that deletes, from the memory, error information on an error determined by the determiner to have been resolved, a counter that counts a number of one or more unresolved errors determined by the determiner not to have been resolved, and a number displayer that visually displays the number of the one or more unresolved errors counted by the counter.

A second aspect of the present invention is an image forming apparatus according to the first aspect of the present invention. The image forming apparatus further includes a function selection screen displayer that displays a function selection screen which includes a function selection image for selecting one of a plurality of functions and allows selection of a function to use from among the plurality of functions. The error information storage stores the error information which includes information on a function at a time of occurrence that is a function having been selected when the error has occurred. The counter counts the number of the one or more unresolved errors for each function at the time of occurrence. The number displayer displays the number of the one or more unresolved errors counted by the counter for each function at the time of occurrence in a badge that is placed in a vicinity of a corresponding function selection image or at least partially overlaps with the corresponding function selection image.

A third aspect of the present invention is an image forming apparatus according to the second aspect of the present invention. In the image forming apparatus, when the function selection image, in the vicinity of which the badge with the number of the one or more unresolved errors displayed in the badge is placed or with which the badge with the number of the one or more unresolved errors displayed in the badge at least partially overlaps, is selected, the notifier re-notifies one or more error messages about the one or more unresolved errors.

A fourth aspect of the present invention is an image forming apparatus according to the third aspect of the present invention, which further includes a notification selection screen displayer that displays a notification selection screen allowing selection of an error message to be re-notified by the notifier when the number of the one or more unresolved errors displayed in the badge, which is placed in the vicinity of the function selection image selected or at least partially overlaps with the function selection image selected, is two or more.

A fifth aspect of the present invention is an image forming apparatus according to the first aspect of the present invention, which further includes a status confirmation screen displayer that displays a status confirmation screen which includes a process selection image for selecting one of a plurality of processes and allows a current status of one process selected from among the plurality of processes to be confirmed. The error information includes information on a process at a time of occurrence that is a process having been executed when the error has occurred. The counter counts the number of the one or more unresolved errors for each process at the time of occurrence. The number displayer displays the number of the one or more unresolved errors counted by the counter for each process at the time of occurrence in a badge that is placed in a vicinity of a corresponding process selection image or at least partially overlaps with the corresponding process selection image.

A sixth aspect of the present invention is an image forming apparatus according to the fifth aspect of the present invention. In the image forming apparatus, when the process selection image, in the vicinity of which the badge with the number of the one or more unresolved errors displayed in the badge is placed or with which the badge with the number of the one or more unresolved errors displayed in the badge at least partially overlaps, is selected, the notifier re-notifies one or more error messages about the one or more unresolved errors.

A seventh aspect of the present invention is an image forming apparatus according to the sixth aspect of the present invention, which further includes a notification selection screen displayer that displays a notification selection screen allowing selection of an error message to be re-notified by the notifier when the number of the one or more unresolved errors displayed in the badge, which is placed in the vicinity of the process selection image selected or at least partially overlaps with the process selection image selected, is two or more.

An eighth aspect of the present invention is an image forming apparatus according to any one of the second to seventh aspects of the present invention. In the image forming apparatus, the counter phasedly counts a number of one or more unresolved errors that are each to be resolved in phases. The number displayer displays count numbers, which are obtained through phased counting by the counter, separately in badges equal in number to the phases, so as to make the count numbers distinguishable for each phase.

A ninth aspect of the present invention is an image forming apparatus according to the eighth aspect of the present invention. In the image forming apparatus, the notifier notifies, about any of the one or more unresolved errors that are each to be resolved in the phases, an error message having a different content for each phase.

A tenth aspect of the present invention is a recording medium storing a control program for controlling an image forming apparatus including an error information storage that stores, in a memory, error information on an error that has occurred. The control program causes a processor of the image forming apparatus to execute a method that includes notifying an error message corresponding to the error, determining whether the error has been resolved, deleting, from the memory error information on an error determined to have been resolved during the determining, counting a number of one or more unresolved errors determined not to have been resolved during the determining, and visually displaying, on a display device, the number of the one or more unresolved errors counted during the counting.

An eleventh aspect of the present invention is a control method for controlling an image forming apparatus including an error information storage that stores, in a memory, error information on an error that has occurred. The control method includes (a) notifying an error message corresponding to the error, (b) determining whether the error has been resolved, (c) deleting, from the memory, error information on an error determined to have been resolved during the (b), (d) counting a number of one or more unresolved errors determined not to have been resolved during the (b), and (e) visually displaying, on a display device, the number of the one or more unresolved errors counted during the (d).

According to the present invention, the number of unresolved errors is visually displayed until the unresolved errors are resolved. Therefore, even if an error message is not displayed, it is easy to know that there is an unresolved error.

BRIEF DESCRIPTION OF THE DRAWINGS

FIG. 7 is a table illustrating an example of a notification table.

FIG. 8 is a table illustrating an example of an error table.

FIG. 23 is a table illustrating an example of a notification table according to the second embodiment.

FIG. 24 is a table illustrating an example of an error table according to the second embodiment.

DESCRIPTION OF THE PREFERRED EMBODIMENTS

The above and other objects, features, and advantages of the present invention will become more apparent from the detailed description of the following embodiments given with reference to the drawings.

First Embodiment

Figure 1:
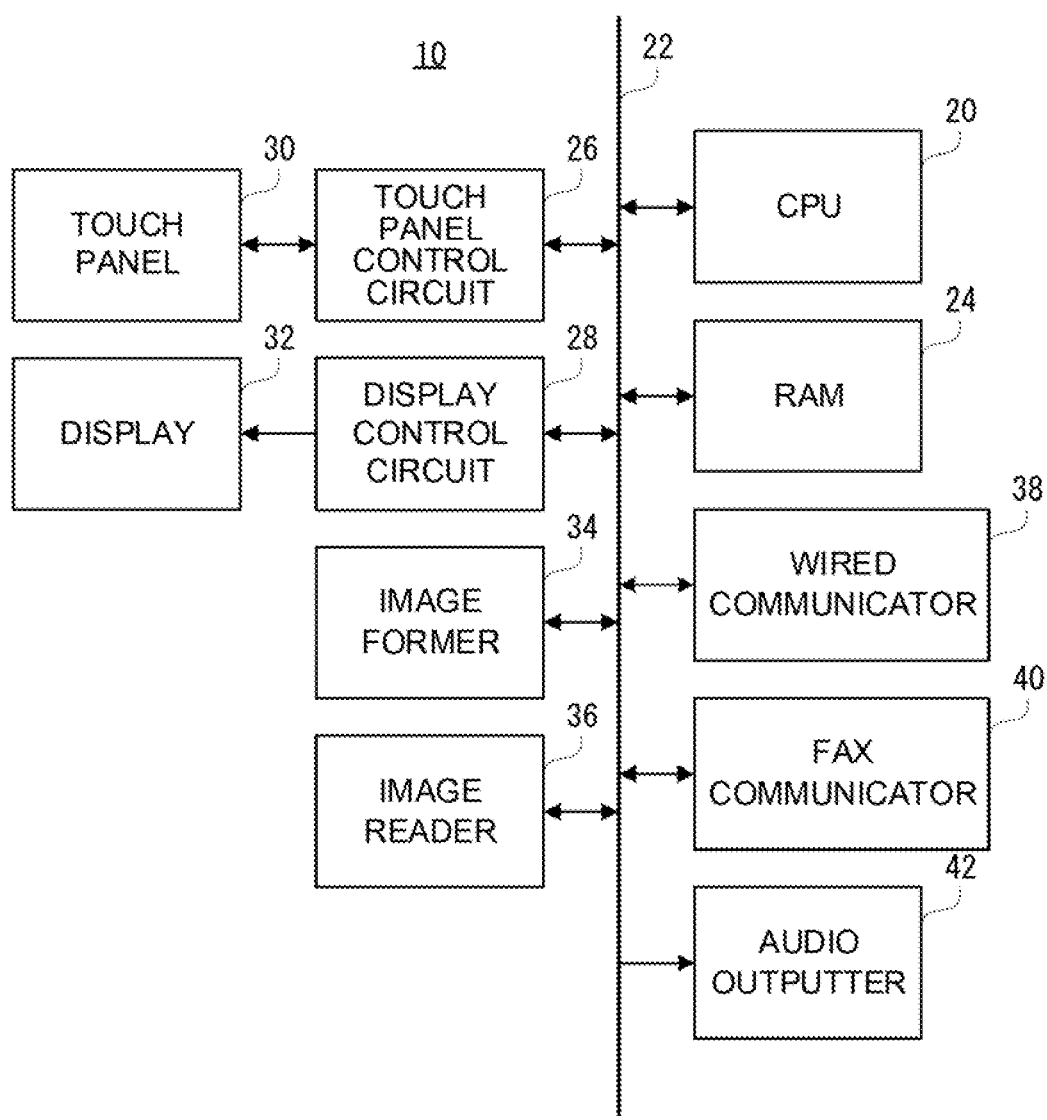
FIG. 1 is a block diagram illustrating an electrical configuration of an image forming apparatus.

FIG. 1 is a block diagram illustrating an electrical configuration of an image forming apparatus 10. As illustrated in FIG. 1, the image forming apparatus 10 includes a CPU 20. The CPU 20 is connected to, via a bus 22, a RAM 24, a touch panel control circuit 26, a display control circuit 28, an image former 34, an image reader 36, a wired communicator 38, a fax communicator 40, and an audio outputter 42. In addition, the image forming apparatus 10 includes a touch panel 30 and a display 32. The touch panel 30 is connected to the touch panel control circuit 26, and the display 32 is connected to the display control circuit 28.

The CPU 20 is in charge of overall control of the image forming apparatus 10. The RAM 24 is used as a work area and a buffer area of the CPU 20.

The touch panel control circuit 26 applies a required voltage or the like to the touch panel 30, detects a touch operation or a touch input within a touch effective range of the touch panel 30, and outputs, to the CPU 20, touch coordinate data of a position specified by the touch operation or touch input.

The touch panel 30 is provided on the display surface of the display 32. As the touch panel 30, any type such as a capacitance type, an electromagnetic induction type, a resistive film type, and an infrared type can be used. In addition, a touch panel display in which the touch panel 30 and the display 32 are integrated may be used.

The display control circuit 28 includes a GPU, a VRAM, and the like. Under the instruction of the CPU 20, the GPU generates, in the VRAM, display image data for displaying various screens on the display 32 with the use of image generation data 404b (see FIG. 10) stored in the RAM 24, and outputs the generated display image data to the display 32.

The display 32 is a general-purpose display device such as an LCD or an EL (Electro-Luminescence) display.

The image former 34 includes a photosensitive drum, a charging device, an exposure device, a developing device, a transfer device, a fixing device, and the like, and forms an image on a sheet surface with the use of a dry-type electrophotographic method. As the image data for forming an image on a sheet surface, image data read by the image reader 36 and image data sent from an external information processing apparatus or the like are used. In addition, a sheet for image recording is not limited to a recording sheet made of paper, and a sheet of other material than paper, such as an OHP film, is also usable.

Although a detailed description is omitted, the image forming apparatus 10 includes a color printing function, and the image former 34 includes, for each color of Y (yellow), M (magenta), C (cyan), and K (black), four photosensitive drums, four charging devices, four developing devices, four intermediate transfer rollers, four cleaning devices, and the like. In addition, for each color, an image forming station including a photosensitive drum, a charging device, a developing device, a transfer roller, and a cleaning device is configured. The image forming apparatus 10 is a tandem type image forming apparatus in which image forming stations for each color are arranged in a line in the image former 34.

The image reader 36 includes a light source, a plurality of mirrors, an imaging lens, a line sensor, and the like. The image reader 36 guides the light reflected from a document surface to the imaging lens by a plurality of mirrors. Then, the reflected light is imaged on a light receiving element of the line sensor by the imaging lens. A luminance or chromaticity of the reflected light imaged on the light receiving element is detected by the line sensor, and read image data based on the image of the document surface is generated, and thus the image data is input. In addition, a CMOS (Complementary Metal Oxide Semiconductor) and a CCD (Charge Coupled Device) are used for the line sensor.

The wired communicator 38 includes a wired communication circuit for connecting to a network such as a LAN, and is an interface for communicating with a computer and a communication terminal on the network. As an example, the wired communicator 38 transmits and receives data on the basis of a wired communication method conforming to the Ethernet (registered trademark) communication standard.

The fax communicator 40 includes a fax modem, and is connected to an external public telephone line. The fax modem is an interface for the image forming apparatus 10 to perform a fax communication with an external apparatus via the public telephone line. Note that, in this specification, the external apparatus refers to an image forming apparatus such as an MFP including a fax or a fax function.

The audio outputter 42 includes a speaker, a D/A converter, and an amplifier. The D/A converter converts a digital audio signal to an analog signal. The amplifier amplifies an analog audio signal. The speaker outputs audio corresponding to the analog audio signal that has been converted to an analog signal and amplified.

In the first embodiment, the image forming apparatus 10 is a multifunction machine (MFP: Multifunction Peripheral) including a duplication function (copy function), a printer function, a scanner function, and a fax function, and the like. The image forming apparatus 10 can be applied to other image forming apparatuses such as a duplication machine (copy machine), a printing machine (printer), and a fax.

In addition, the electrical configuration of the image forming apparatus 10 illustrated in FIG. 1 is merely an example, and need not be limited to this. For example, a wireless communicator may be provided as an alternative to the wired communicator 38.

In the image forming apparatus 10 according to the first embodiment, any operation mode out of a copy mode allowing a copy function to be executed, a fax mode allowing a fax function to be executed, and a scan mode allowing a scanner function to be executed can selectively be set as described later.

In addition, in the copy mode, by accepting a user's operation, a scan job (scan process) and a print job (print process) are executed successively. In the fax mode, by accepting a user's operation, the scan job (scan process) and fax job (fax transmission process) are executed successively. In the scan mode, by accepting a user's operation, after the scan job, another job is executed. The other job here means a process that stores data generated from a document by the scan job, in a storage medium such as an HDD in the image forming apparatus 10, or in a storage medium such as an HDD of a computer on a network via the wired communicator 38, and transmits the data to the network via the wired communicator 38 in the form of an electronic mail.

Furthermore, in the first embodiment, when the fax communication is started by the response from the external apparatus, the fax job and the print job are executed successively. In addition, when a command to execute a designated print job and image data to be input (hereinafter referred to as "input image data") are received from a computer or a communication terminal on the network via the wired communicator 38, the print job is executed. Note that, the print job for the input image data may be executed in accordance with an operation of the user using the touch panel 30 of the image forming apparatus 10. Moreover, the input image data may be read (or input) from an external storage medium (such as a USB memory or an SD card) detachable from the image forming apparatus 10.

In the print job, the image former 34 is controlled, and data output correspondingly to the input image data (hereinafter referred to as "output image data") is printed on a recording sheet.

In the scan job, the image reader 36 is controlled, and data generated from a document read by the image reader 36 is input as the input image data.

In the fax job, the image data input by the scan job is transmitted to an external apparatus via the fax communicator 40, and the output image data is received via the fax communicator 40.

Figure 2:
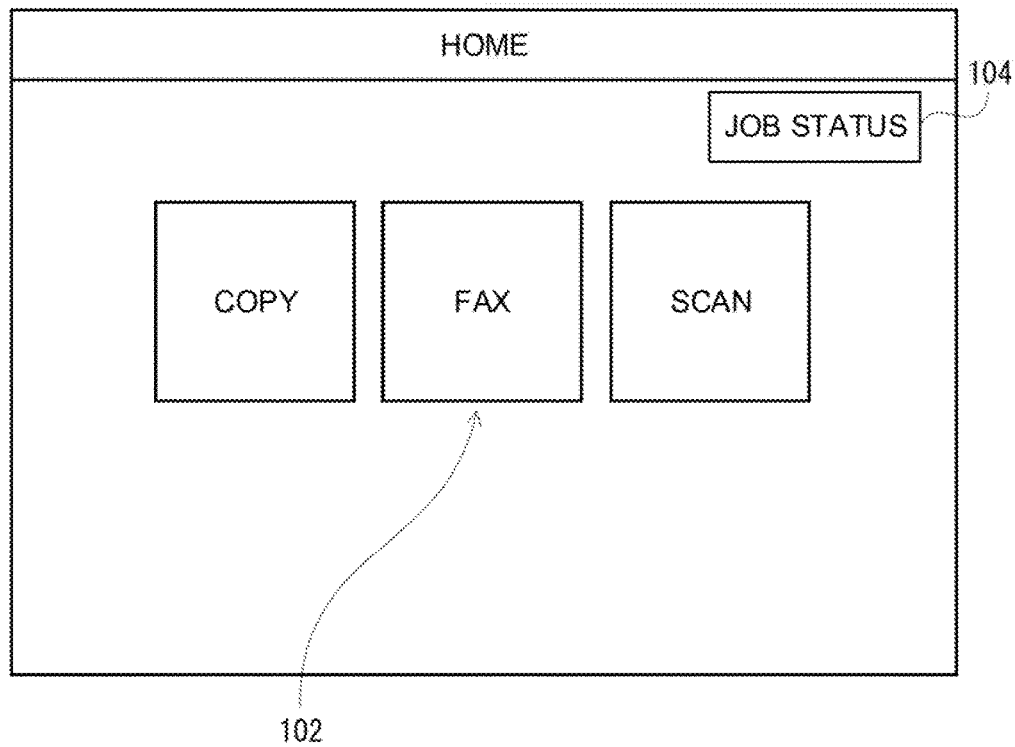
FIG. 2 is a diagram illustrating an example of a home screen displayed on a display of the image forming apparatus.

FIG. 2 is an example of a home screen 100 (corresponding to the "function selection screen"). The home screen 100 is displayed on the display 32 when the user instructs the cancellation of a power saving mode in a state where the power of the image forming apparatus 10 is turned on or the image forming apparatus 10 is set to the power saving mode. In addition, the home screen 100 is displayed on the display 32 when a home button is pressed in a selected operation mode before the start of a job, after the job ends, or when the job is interrupted. Note that the job is interrupted when an error occurs.

In the home screen 100, a plurality of buttons (hereinafter referred to as "mode selection buttons") 102 for selecting an operation mode and a button (hereinafter referred to as "job status button") 104 for confirming a job status are provided.

The mode selection buttons 102 (corresponding to the "function selection images") are provided to select any of the operation modes of the copy mode, fax mode, and scan mode, and when one of the mode selection buttons 102 is touched, an operation mode corresponding to the touched mode selection button 102 is started.

The job status button 104 is provided to confirm the status (i.e., progress) of each job described above. When the job status button 104 is touched, a job status screen 160 (see FIG. 6) described later is displayed on the display 32.

As described above, when the copy mode, fax mode, or scan mode is set, various screens for executing the above-mentioned job in each operation mode are displayed on the display 32.

Figure 3:
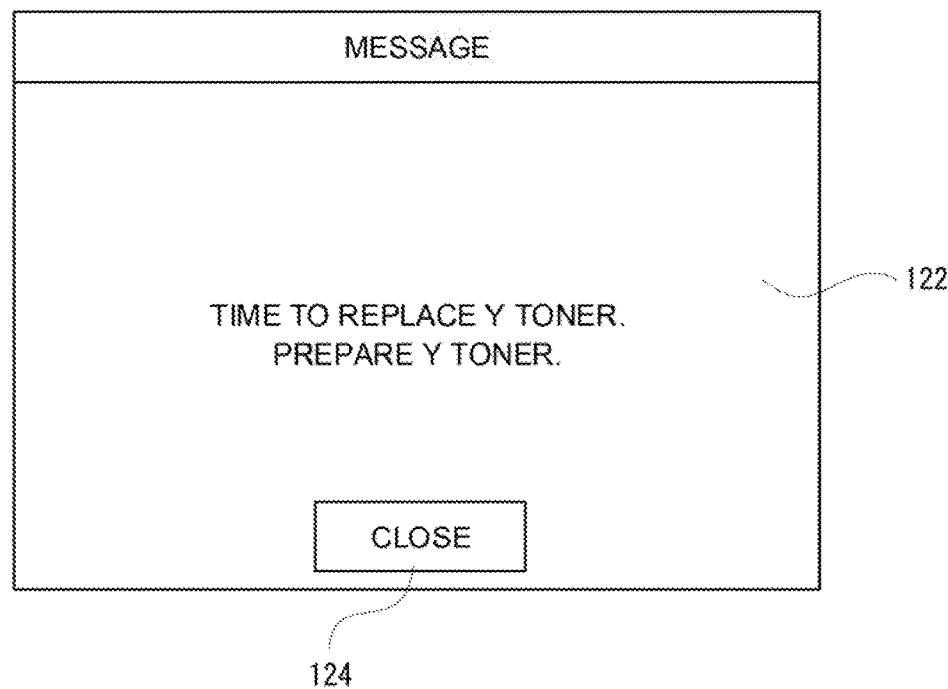
FIG. 3 is a diagram illustrating an example of a message box displayed on the display of the image forming apparatus.

If an error occurs during the execution of the print job, scan job, or fax job, that is, if the job is interrupted, an error message corresponding to the content of the error that has occurred is notified to the user. Specifically, the audio of the error message is output from the audio outputter 42, and a screen including a text of error message, such as a screen (i.e., a message box) 120 illustrated in FIG. 3, is displayed on the display 32.

In the first embodiment, the user is notified of the occurrence of an error by both audio output and screen display. However, the notification may be made by either one of them. The same applies to the case of notifying that the error has been resolved, which will be described later.

In addition, the print job can be executed when the remaining amount of a toner is below a predetermined amount, not when the toner is out. In the first embodiment, it is determined that an error has occurred even when the remaining amount of a toner is below the predetermined amount, and the user is prompted to prepare (purchase, etc.) a new toner.

The message box 120 is a dialog box (or a screen) for notifying a message (in FIG. 3, an error message) to the user, and is displayed on the front of the screen already displayed on the display 32.

In the message box 120, a message display area 122 is provided. In this message display area 122, a text of a predetermined message (here, an error message) is described. In the example illustrated in FIG. 3, a message indicating that it is time to replace a Y toner and that the Y toner should be prepared is described.

In addition, the message box 120 is provided with a close button 124. This close button 124 is displayed below, for example, a message described in the message display area 122.

The close button 124 is provided to close the message box 120. Therefore, when the close button 124 is touched, the message box 120 for an error is deleted (hidden) from the display 32 and the display 32 returns to a screen immediately before the error occurs.

In addition, when an error is resolved, a message corresponding to the content of the resolved error (hereinafter referred to as "resolution message") is notified to the user. However, depending on the content of the resolved error, the resolution message may not be notified to the user.

When the resolution message is notified to the user, as described above, the audio of the resolution message is output from the audio outputter 42, and the message box 120 in which the resolution message is described is displayed on the display 32.

In the first embodiment, the message box 120, in which the resolution message is described, does not have a close button, and is automatically deleted from the display 32 after a predetermined time elapses, and the screen returns to the previous screen as is the case with the message box 120 in which the error message is described.

In addition, when an error is resolved, there is no need to display an error message about the resolved error. Therefore, information about the resolved error (the operation mode, the content of the job, and the notification ID that are to be described later) is deleted (or erased) from an error table 220 (see FIG. 8).

The occurrence and resolution of various errors are determined or detected on the basis of the output from a predetermined sensor. The method of this determination or detection is already well known and is not essential to the present invention. Therefore, the detailed description is omitted.

Figure 4:
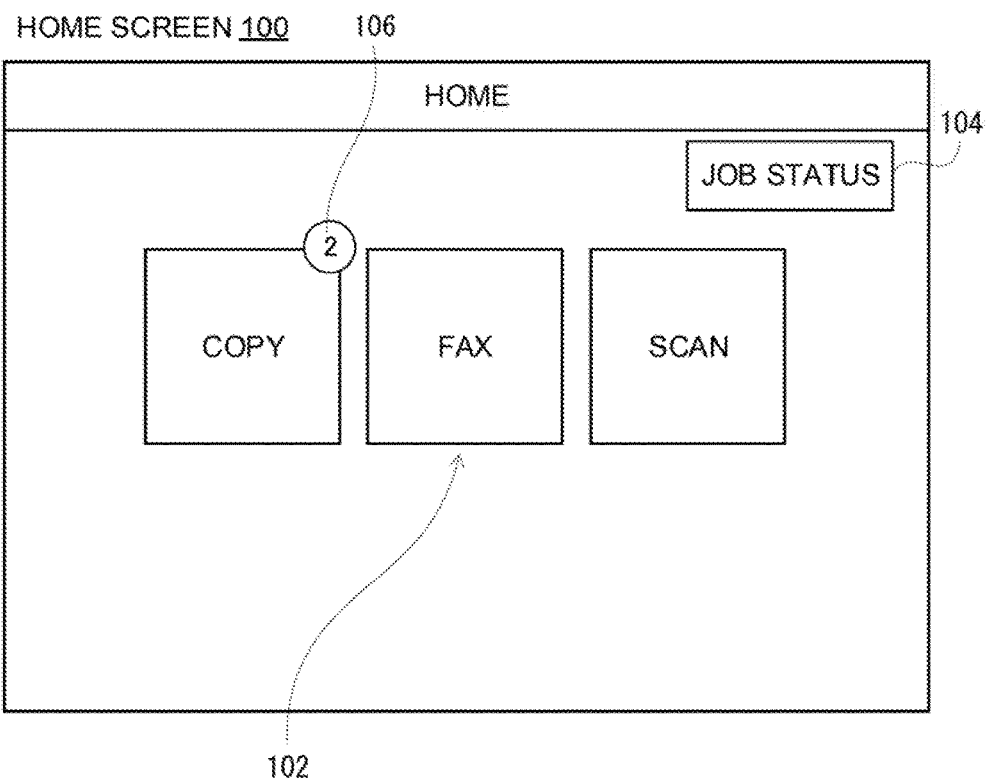
FIG. 4 is a diagram illustrating another example of the home screen displayed on the display of the image forming apparatus.

FIG. 4 illustrates another example of the home screen 100 in the first embodiment. This home screen 100 is displayed on the display 32 when there is at least one error not resolved yet (hereinafter also referred to as "unresolved error"). In the home screen 100 illustrated in FIG. 4, a badge 106 is further displayed on the home screen 100 illustrated in FIG. 2.

In the first embodiment, the badge 106 is an image for visually displaying the number of unresolved errors for each operation mode. The number displayed in the badge 106 means the number of unresolved errors. However, if the number of unresolved errors is 0, the badge 106 is not displayed. The same applies to other badges 108, 166, and 170 described later.

In addition, in the example illustrated in FIG. 4, the badge 106 is located at a position where a part of the badge overlaps with the upper right corner of the mode selection button 102 for selecting the copy mode, and is displayed on the front of the mode selection button 102.

In addition, the display position of the badge 106 is an example, and does not need to be limited. As long as it is known which mode selection button 102 (or operation mode) the badge 106 is for, the badge 106 may be displayed at another position. For example, the badge 106 may be displayed in contact with or close to the frame line (upper or lower end, etc.) of the mode selection button 102. Moreover, the entire badge 106 may be displayed so as to overlap with the mode selection button 102.

In addition, in the first embodiment, the badge 106 is a circular image, but the shape and color do not need to be particularly limited. However, it is considered that the visibility is higher if the color of the badge 106 is different from the color of the mode selection button 102.

When the mode selection button 102 is touched on the home screen 100, the operation mode corresponding to the touched mode selection button 102 is selected or set. In the operation mode selected on the home screen 100 (hereinafter simply referred to as "selected operation mode"), if the number of unresolved errors is 1, an error message corresponding to the content of the unresolved error is notified to the user.

If the number of unresolved errors in the operation mode selected on the home screen 100 is 0 as illustrated in FIG. 2, the badge 106 is not displayed and a screen for executing a job in the selected operation mode is displayed on the display 32.

However, if the number of unresolved errors in the selected operation mode is 2 or more, a list of error messages is displayed, and the error message selected in this list is notified to the user.

Figure 5:
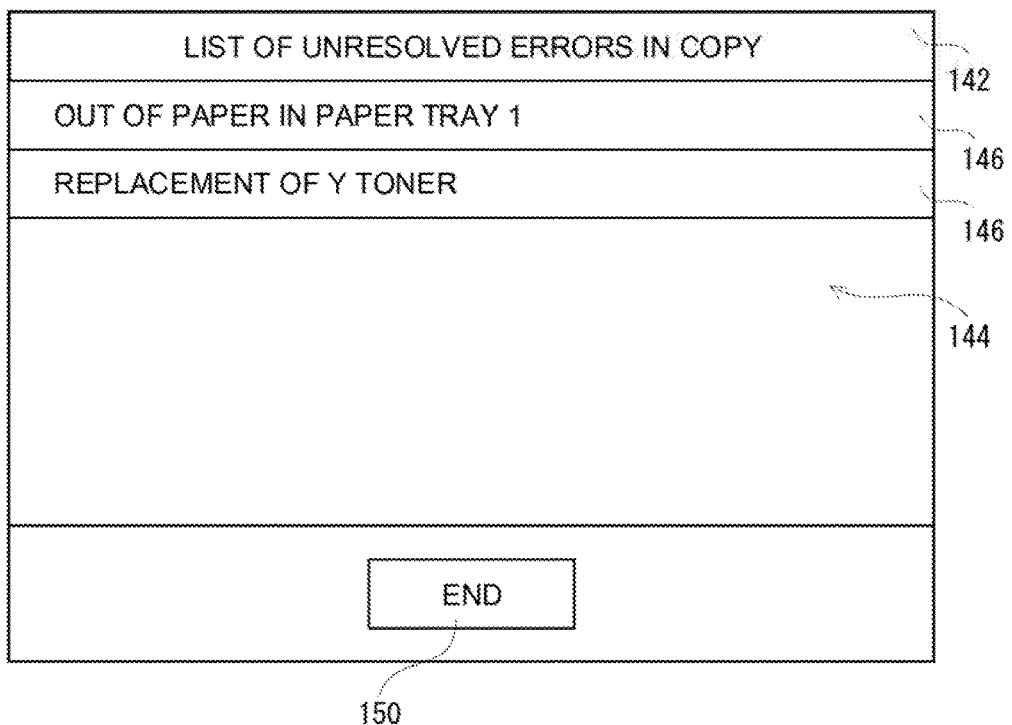
FIG. 5 is a diagram illustrating an example of a message list screen displayed on the display of the image forming apparatus.

FIG. 5 illustrates an example of a message list screen 140 (corresponding to the "notification selection screen") displayed on the display 32. The message list screen 140 is a screen for displaying the list of error messages corresponding to unresolved errors in the selected operation mode.

As illustrated in FIG. 5, a display area 142 is provided at the upper part of the message list screen 140 for the operation mode, and in the display area 142, a text indicating that the displayed list is the list of error messages in the selected operation mode is described (or displayed).

A display area 144 is provided below the display area 142. In this display area 144, the list of error messages in the selected operation mode is displayed. The list of error messages is a list of notification buttons 146 for notifying the user of respective unresolved errors. The notification buttons 146 are displayed with reference to an error column of an error table 220 described later.

In the example illustrated in FIG. 5, the notification button 146 for making notification about "out of paper in paper tray 1" and the notification button 146 for making notification about "replacement of Y toner" are displayed in a list. When the notification button 146 for making notification about "replacement of Y toner" is touched, the audio about the replacement of the Y toner is output from the audio outputter 42, and a message box such as the message box 120 illustrated in FIG. 3 is displayed on the front of the message list screen 140. Note that, each notification button 146 is associated with identification information (hereinafter referred to as "notification ID") for identifying an error message to be notified, and the content of notification is determined on that basis of the notification ID as described later. Although the description is omitted, when another notification button 146 is touched, the error message is similarly notified. In addition, when the message box 120 is closed, the message list screen 140 is displayed on the display 32. That is, the display 32 returns to the previous screen.

An end button 150 is provided below the display area 144. The end button 150 is a button for closing the message list screen 140. When the end button 150 is touched, the message list screen 140 is closed (hidden), and a screen for executing a job of the selected operation mode is displayed on the display 32. Note that, until the end button 150 is touched, by the notification button 146 being touched, an error message corresponding to the notification button 146 is notified.

As described above, if there are unresolved errors, the number of such errors is displayed on the home screen 100 by the badge 106 for each operation mode. Similarly, when the job status screen 160 is displayed, the number of unresolved errors is displayed in the badge 166 for each job.

Figure 6:
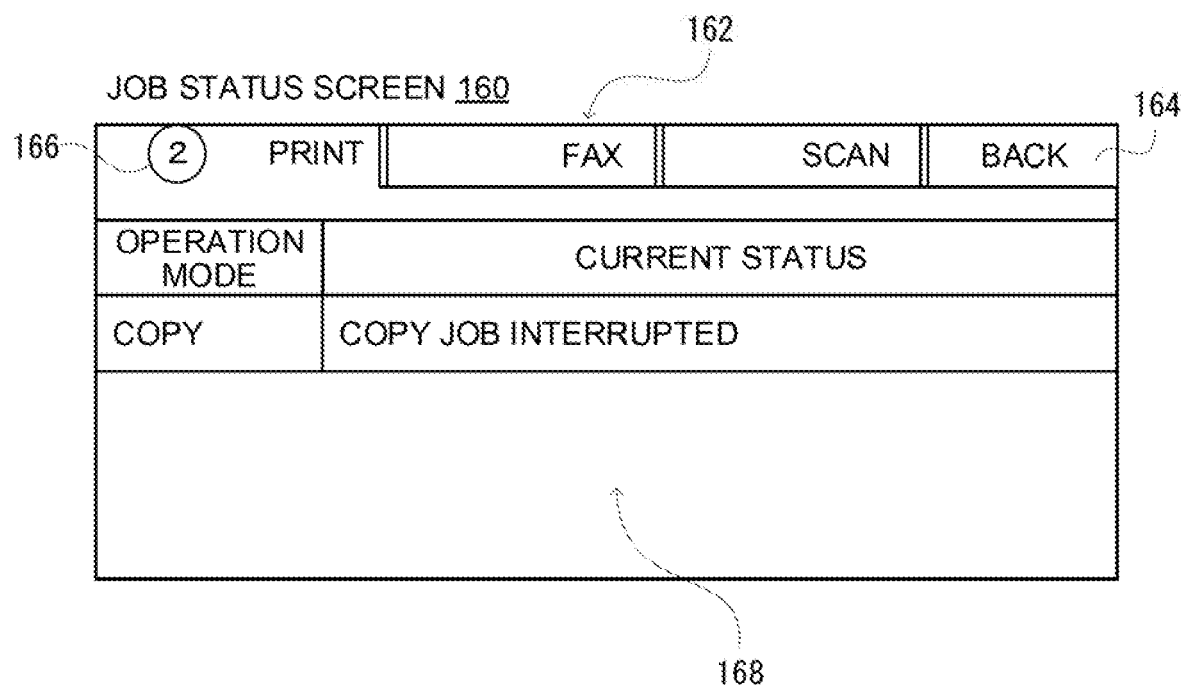
FIG. 6 is a diagram illustrating an example of a job status screen displayed on the display of the image forming apparatus.

FIG. 6 is an example of the job status screen 160 (corresponding to the "status confirmation screen") in the first embodiment. When the job status button 104 is touched on the home screen 100 illustrated in FIG. 4, a job status screen such as the job status screen 160 illustrated in FIG. 6 is displayed on the display 32.

The job status screen 160 is a screen for confirming the status of a currently selected job. The job status screen 160 is provided with a plurality of tabs 162 and a back button 164 at the top of the screen. In the first embodiment, the tabs 162 (corresponding to the "process selection images") are provided in correspondence with respective jobs: print, fax, and scan (a print job, a fax job, and a scan job). In addition, in the example illustrated in FIG. 6, the badge 166 is displayed at a position where the badge 166 overlaps with the tab 162 which corresponds to the print job. The badge 166 is provided for displaying the number of unresolved errors for each job.

In the first embodiment, the badge 166 is displayed at a position where the badge 166 overlaps with the tab 162, to which the present invention does not need to be limited. The badge 166 may be displayed at a position where the badge 166 partially overlaps with the tab 162, or may be displayed in the vicinity of the tab 162.

In addition, in the job status screen 160, a display area 168 for displaying the current status of a job is provided below the tabs 162 and the back button 164. Note that, in the display area 168, the status of the job corresponding to the currently selected tab (the print job in FIG. 6) is displayed. In the first embodiment, the status of the currently selected job is displayed in the display area 168 along with the current operation mode.

In the first embodiment, when the job status screen 160 is displayed and when another job is selected, if an unresolved error has occurred in the currently selected job, an error message notification is performed in the same manner as when a job screen is displayed.

That is, when the job status button 104 is touched on the home screen 100, if there is one unresolved error in the print job, the job status screen 160, in which the status of the currently selected job is displayed in the area 168, is displayed on the display 32 after the error message notification is performed. In the error message notification, the audio of the error message of the unresolved error of the print job is output from the audio outputter 42, and the message box 120 in which the error message is described such as that illustrated in FIG. 3 is displayed on the display 32. In addition, if there are two or more unresolved errors in the print job, a massage list screen such as the message list screen 140 illustrated in FIG. 5 is displayed, and in response to the notification button 146 being touched, the error message notification is performed as described above. Then, when the end button 150 is touched on the message list screen 140, the message list screen 140 is hidden, and the job status screen 160, in which the status of the currently selected job is displayed in the display area 168, is displayed.

When a different tab 162 that is different from the tab 162 corresponding to the currently selected job is touched on the job status screen 160 and there is one unresolved error in a different job corresponding to the different tab 162 (here, a fax job or a scan job), the job status screen 160, in which the job status of the other job (i.e., the currently selected job) is displayed in the display area 168, is displayed on the display 32 after the error message notification is performed. If there are two or more unresolved errors in the different job, when a message list screen as the message list screen 140 illustrated in FIG. 5 is displayed and, in response to the notification button 146 being touched, the error message notification is performed as described above. Then, when the end button 150 is touched on the message list screen 140, the message list screen 140 is hidden and the job status screen 160, in which the job status of the other job is displayed in the display area 168, is displayed.

In addition, when the back button 164 is touched on the job status screen 160, the job status screen 160 is closed (or hidden), and a screen for executing the job of the current operation mode is displayed on the display 32.

In addition, when an unresolved error is resolved, the notification that the error has been resolved is performed in accordance with a notification table 200. The notification that the error has been resolved is also performed by audio output and screen display. Note that, depending on the content of the error, the notification that the error has been resolved may not be performed. For example, when a paper jam in the paper conveyance path has been cleared, the job can be thereby executed and an operation panel including a start key can be operated. Therefore, the user can know that the error has been resolved without receiving a notification of the error being resolved. Moreover, when the transmission failure of the fax is resolved, the user is notified of the success of the fax transmission, and thus the user can know the error has been resolved without receiving a notification of the error being resolved.

In the first embodiment, the error message notification is performed when the different tab 162, which is different from the tab 162 corresponding to the currently selected job, is touched and there is an unresolved error in the different job, which corresponds to the different tab 162, to which the present invention does not need to be limited. If there is an unresolved error in the currently selected job, the error message notification may be performed even when the tab 162 corresponding to the currently selected job is touched.

The above-described notification about the occurrence of an error and the notification about the resolution of an error are performed on the basis of the notification table 200 illustrated in FIG. 7 and the error table 220 illustrated in FIG. 8, respectively. The display of the badge 106 on the home screen 100 and the display of the badge 166 on the job status screen 160 are performed on the basis of the error table 220 illustrated in FIG. 8, respectively.

FIG. 7 illustrates an example of the notification table 200. As illustrated in FIG. 7, in the notification table 200, an error, an error message notification method, and a resolution message notification method are described in correspondence with a notification ID.

The notification ID is identification information for identifying the error message and the resolution message according to the content of the error. The audio data and text data (error data 404c described later) for the error message and the resolution message linked by the notification ID are stored in the RAM 24. In the first embodiment, the notification ID is described by a numeral, but other symbols may be used. Note that, the notification ID is used only in the internal processing in the image forming apparatus 10. Therefore, symbols that cannot be interpreted by humans may be used. This also applies to an error ID described later.

The content of the error is described in the error column. The content of the error is a character string that simply indicates the content of the error that has occurred or has not been resolved. In the example illustrated in FIG. 7, in the error column, "replacement of Y toner", "out of paper in paper tray 1", and "fax transmission failure" are described.

The "replacement of Y toner" means an error that the remaining amount of Y toner is low. The "out of paper in paper tray 1" means an error that the sheets set in the paper tray 1 have run out (or are missing). The "fax transmission failure" means an error that the fax fails or failed to be transmitted.

In the column of error message notification method, a method for notifying an error message is described. In the first embodiment, as the method for notifying the message, there is a method for outputting audio of the message and a method for displaying a text of the message on a screen. Therefore, in the column of error message notification method, audio or/and screen display are described. The same applies to a resolution message notification method described later. In the example illustrated in FIG. 7, in the column of error message notification method, the text "audio/screen display" is described. The "audio/screen display" means that the error message notification is performed by both audio output and screen display.

In the column of resolution message notification method, a method for notifying a resolution message is described. In the example illustrated in FIG. 7, the character strings of "audio/screen display" and "no notification" are described.

The "audio/screen display" means that the resolution message notification is performed by both audio output and screen display. The "no notification" means that the resolution message is not notified.

Since the error message notification method and the resolution message notification method are used only for the internal processing of the image forming apparatus 10, in fact, not a character string but information indicating the notification method (for example, identification information indicating whether there is notification) is described.

In addition, although omitted in FIG. 7, the content of an error, error message notification method, and resolution message notification method are described for all errors that occur in the image forming apparatus 10.

In the first embodiment, when an error occurs, an error message notification method corresponding to the content of the error that has occurred is determined in accordance with the notification table 200 illustrated in FIG. 7. In addition, when the error that has occurred is resolved, the resolution message notification method corresponding to the content of the resolved error is determined in accordance with the notification table 200 illustrated in FIG. 7. However, as described above, the error message and the resolution message to be notified are determined in advance in accordance with the content of the error (that is, in association with the notification ID).

In addition, even in a case where the error message is re-notified when the mode selection button 102, with which the badge 106 overlaps, is displayed and touched on the home screen 100 or when the job status button 104 is touched on the home screen 100, on which the badge 106 is displayed, the error message notification method corresponding to the content of the error, of which the user is to be re-notified, is determined in accordance with the notification table 200 illustrated in FIG. 7.

For example, in the example of the notification table 200 illustrated in FIG. 7, when the error of "replacement of Y toner" occurs or when the user is re-notified of the error, the audio of the error message corresponding to the "replacement of Y toner" is output from the audio outputter 42, and the message box 120 in which the text of the error message is described is displayed on the display 32. In addition, when the error of the "replacement of Y toner" is resolved, the audio of the resolution message corresponding to the "replacement of Y toner" is output from the audio outputter 42, and the message box 120 in which the text of the resolution message is described is displayed on the display 32.

Similarly, for other errors, the error message and the resolution message are notified in accordance with the notification table 200. However, the resolution message may not be notified.

In addition, the notification table 200 is created in advance and stored in a storage of the image forming apparatus 10, specifically, in a nonvolatile memory such as an HDD. Moreover, when the image forming apparatus 10 is started or recovered to the normal mode from the power saving mode, the notification table 200 is read from the above storage and stored in the RAM 24.

FIG. 8 is a table illustrating an example of the error table 220. As illustrated in FIG. 8, in the error table 220, an operation mode, a job, and an error are described in correspondence with an error ID.

The error ID is identification information for individually identifying the error. In the first embodiment, the error ID is described in a capital letter, but other symbols may be used.

In the operation mode column, the content (or name) of the operation mode when an error has occurred is described. In the example illustrated in FIG. 8, "copy" is described in the operation mode column.

In the job column, the content (or name) of the job being executed when the error has occurred. In the example illustrated in FIG. 8, "print" is described in the job column.

In the error column, similarly to the notification table 200, a character string that briefly indicates the content of the error that has occurred or has not been resolved is described. In the example illustrated in FIG. 8, "out of paper in paper tray 1" and "replacement of Y toner" are described.

The error table 220 is generated when the image forming apparatus 10 is started or recovered to the normal mode from the power saving mode, and is stored in the RAM 24. Then, when an error occurs, an error ID is assigned, and the operation mode when the error has occurred, the job being executed when the error has occurred, and the content of the error are described at the end (or bottom) of the error table 220 in correspondence with the assigned error ID. In addition, when the error is resolved, the error ID, operation mode, and job described in correspondence with the error are deleted along with the content of the resolved error.

As described above, in the first embodiment, the display of the badge 106 and the badge 166 is controlled. That is, the number of errors (or unresolved errors) occurring for each operation mode is calculated (or counted), or the number of errors (or unresolved errors) occurring for each job is calculated (or counted), and the numbers displayed on the badge 106 and the badge 166 are determined.

In the example illustrated in FIG. 8, two errors have not been resolved in the copy mode. In addition, two errors have occurred during the execution of the print job.

Figure 9:
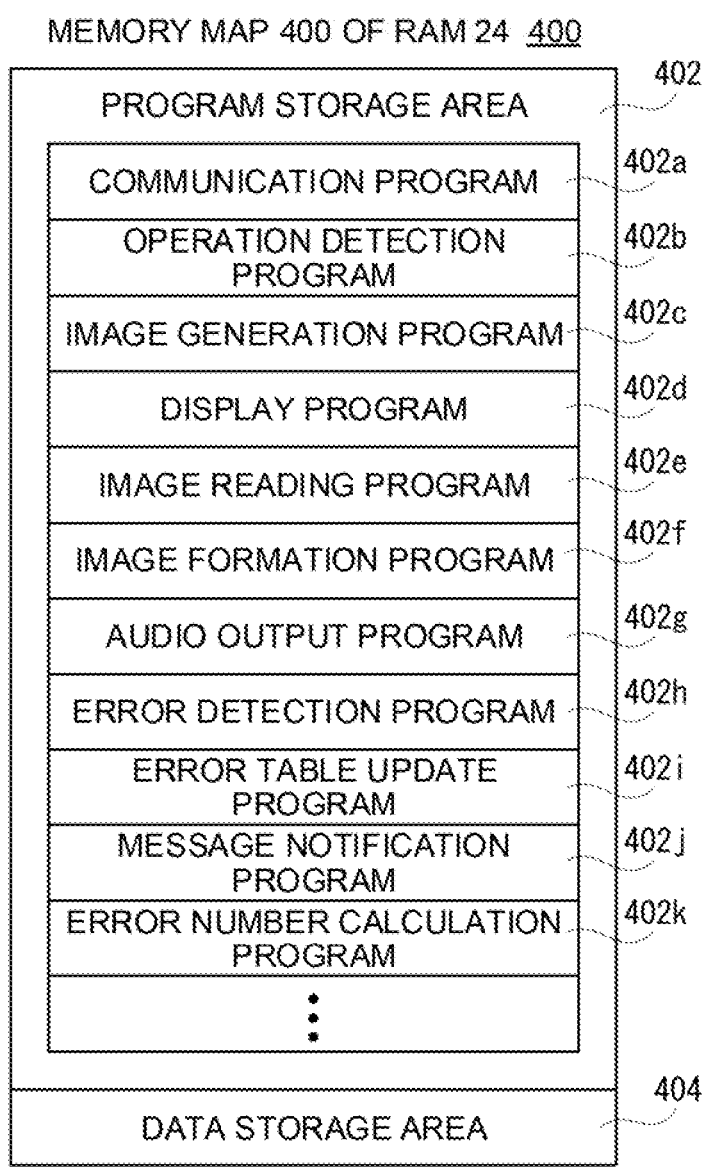
FIG. 9 is a diagram illustrating an example of a memory map of a RAM of the image forming apparatus illustrated in FIG. 1.
Figure 10:
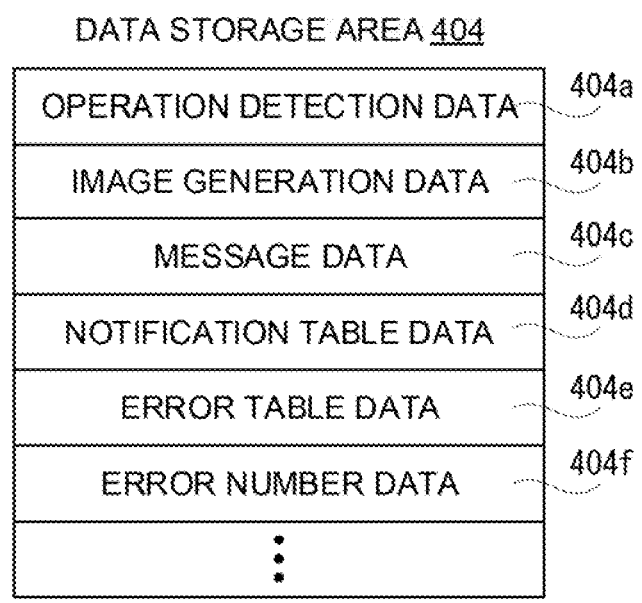
FIG. 10 is a diagram illustrating specific content of a data storage area illustrated in FIG. 9.

FIGS. 9 and 10 are diagrams illustrating an example of a memory map of the RAM 24 illustrated in FIG. 1. As illustrated in FIGS. 9 and 10, the RAM 24 includes a program storage area 402 and a data storage area 404. In addition, the program storage area 402 of the RAM 24 stores a control program of the image forming apparatus 10, that is, an information processing program. The information processing program includes a communication program 402a, an operation detection program 402b, an image generation program 402c, a display program 402d, an image reading program 402e, an image formation program 402f, and an audio output program 402g, an error detection program 402h, an error table update program 402i, a message notification program 402j, and an error number calculation program 402k.

The communication program 402a is a program for controlling the wired communicator 38 to transmit and receive data to and from a computer or a communication terminal on a network. In addition, the communication program 402a is also a program for controlling the fax communicator 40 to transmit and receive data to and from an external apparatus communicably connected via a public telephone line.

The operation detection program 402b is a program for detecting operation detection data 404a (see FIG. 10) corresponding to an operation on each operator of the image forming apparatus 10. Specifically, when the touch panel 30 is touched, the CPU 20 acquires the touch coordinate data output from the touch panel 30 as the operation detection data 404a in accordance with the operation detection program 402b, and stores the data in the data storage area 404. In addition, when a button or a key of the hardware is pressed or operated, the CPU 20 acquires operation detection data 404a by pressing or operating the button or the key, in accordance with the operation detection program 402b, and stores the operation detection data 404a in the data storage area 404.

The image generation program 402c is a program for generating display image data for displaying various display images (in the first embodiment, each of the screens 100, 120, 140 and 160 described above) on the display 32 with the use of image generation data 404b (see FIG. 10) described later.

The display program 402d is a program for displaying, on the display 32, a display image corresponding to the display image data generated in accordance with the image generation program 402c.

The image reading program 402e is a program for controlling the image reader 36 to generate data corresponding to the image of the read document, and for giving or inputting the generated data to the CPU 20 as input image data. Note that, the input image data includes data input from a computer or a communication terminal communicably connected to the image forming apparatus 10 or read from an external storage medium (such as a USB memory or an SD card) detachable from the image forming apparatus 10.

The image formation program 402f is a program for controlling the image former 34 to print the output image data corresponding to the input image data on a recording sheet made of paper or the like.

The audio output program 402g is a program for outputting, the audio data included in the message data 404c described later, to the audio outputter 42, and outputting the audio corresponding to the audio data from a speaker.

The error detection program 402h is a program for detecting (or determining) whether an error has occurred on the basis of the output of a predetermined sensor. Note that, the error detection program 402h may detect that no error has occurred in accordance with the error detection program 402h. In such a case, it can be determined that the error that occurred earlier has been resolved.

The error table update program 402i is a program for updating the error table 220. Specifically, when an error occurs, the content of the error is added to the error table 220, and when the error is resolved, the content of the resolved error is deleted from the error table 220.

The message notification program 402j is a program for notifying an error message or a resolution message in accordance with the notification table 200, and a message data 404c described later is used for the notification of each message.

The error number calculation program 402k is a program that refers to the error table 220 and calculates the number of errors that have occurred (or have not been resolved) for each operation mode or for each job.

Although not illustrated, the program storage area 402 also stores other programs and the like necessary for executing a process in the image forming apparatus 10.

FIG. 10 is a diagram illustrating an example of the specific content of the data storage area 404 illustrated in FIG. 9. The data storage area 404 stores the operation detection data 404a, image generation data 404b, message data 404c, notification table data 404d, error table data 404e and error number data 404f.

The operation detection data 404a is operation data detected in accordance with the operation detection program 402b, and is stored in chronological order. The operation detection data 404a is deleted after being used in the processing of the CPU 20.

The image generation data 404b is data including polygon data and texture data for generating display image data corresponding to the display image displayed on the display 32.

The message data 404c is audio data and text data for a message that the image forming apparatus 10 notifies to the user or the like. As described above, the message data 404c includes audio data and text data of an error message associated with the notification ID and audio data and text data of a resolution message associated with the notification ID.

The notification table data 404d is data about the notification table 200 such as that illustrated in FIG. 7. The error table data 404e is data about the error table 220 such as that illustrated in FIG. 8.

The error number data 404f is data about the number of errors calculated for each operation mode and the number of errors calculated for each job.

Figure 11:
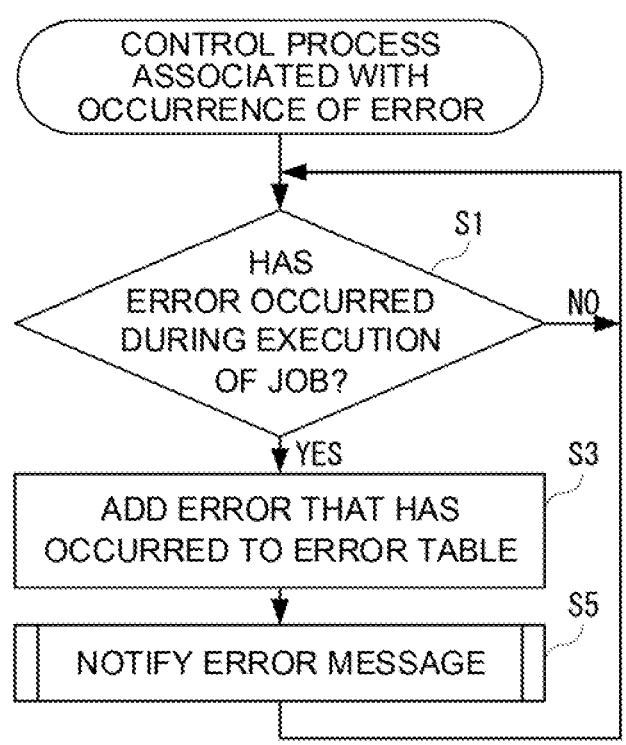
FIG. 11 is a flow diagram illustrating an example of a control process of a CPU of the image forming apparatus, which is associated with an occurrence of an error.

FIG. 11 is a flow diagram illustrating an example of a control process of the CPU 20 illustrated in FIG. 1, which is associated with the occurrence of an error. Although not illustrated, the CPU 20 executes an error detection process in parallel with the processes illustrated in FIGS. 11 to 18. When a new error is detected, the CPU 20 determines that an error has occurred, and when the error that has occurred is no longer detected, the CPU 20 determines that the error has been resolved.

As illustrated in FIG. 11, when starting a control process associated with the occurrence of an error, in step S1, the CPU 20 determines whether an error has occurred during execution of a job. If "NO" in step 1, that is, if no error has occurred, the processing is returned to step S1. If "YES" in step S1, that is, if an error has occurred, the CPU 20 adds the error that has occurred to the error table 220 in step S3. In other words, the error table data 404e is updated. Then, in step S5, an error message notification process (see FIG. 19) described later is executed, and the processing is returned to step S1.

Figure 12:
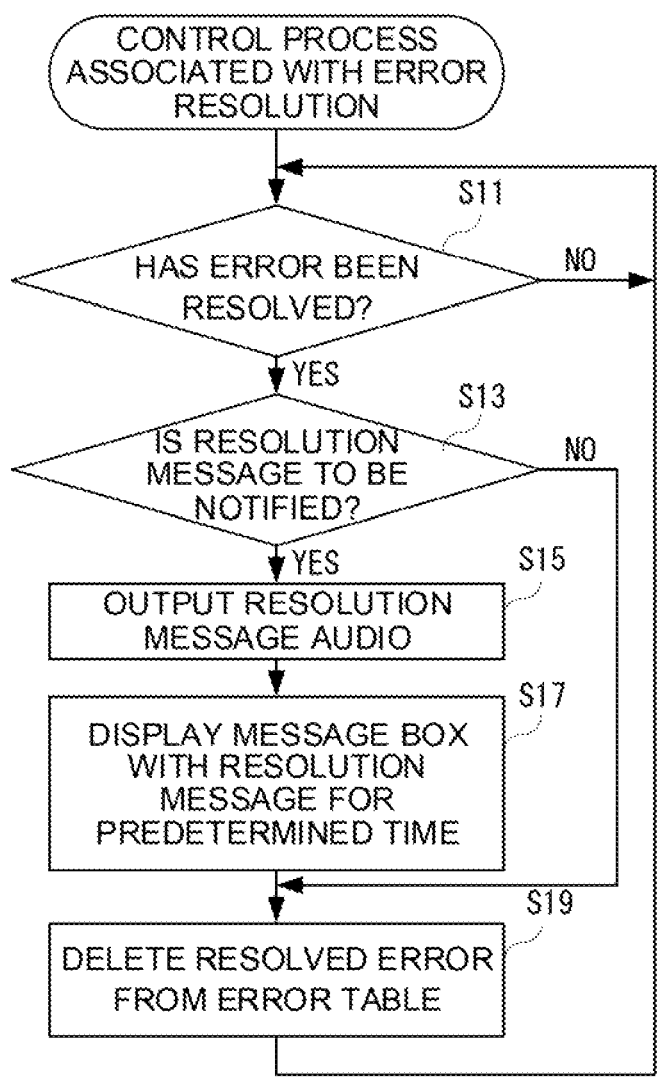
FIG. 12 is a flow diagram illustrating an example of a control process of the CPU of the image forming apparatus, which is associated with the resolution of an error.
Figure 13:
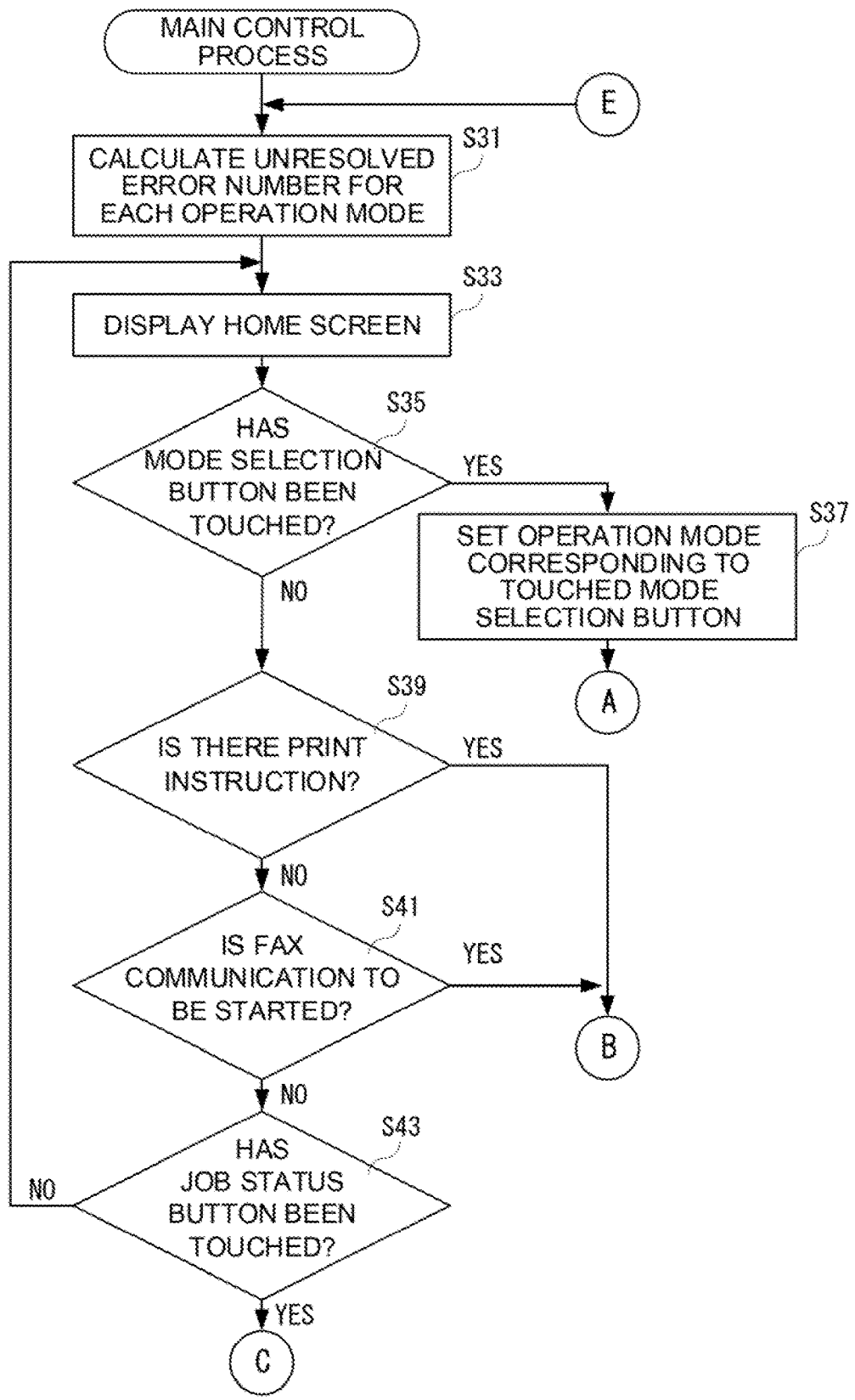
FIG. 13 is a flow diagram illustrating a first part of an example of a main control process of the CPU of the image forming apparatus.

FIG. 12 is a flow diagram illustrating an example of a control process of the CPU 20 illustrated in FIG. 1, which is associated with the resolution of an error.

In step S11, the CPU 20 determines whether the error has been resolved. If "NO" in step S11, that is, if the error has not been resolved, the processing is returned to step S11. If "YES" in step S11, that is, if the error has been resolved, in step S13, the CPU 20 refers to the notification table 200 to determine whether a resolution message is to be notified for the resolved error.

If "NO" in step S13, that is, if determining that the resolution message is not to be notified, the CPU 20 deletes the resolved error from the error table 220 in step S19, and the processing is returned to step S11.

If "YES" in step S13, that is, if determining that the resolution message is to be notified, the CPU 20 outputs the audio of the resolution message from the audio outputter 42 in step S15, and displays, the message box 120 in which the resolution message is described, on the display 32 for a predetermined time in step S17, and the processing is advanced to step S19. The CPU 20 acquires the audio data and text data linked to the notification ID corresponding to the content of the resolved error, from the message data 404c stored in the RAM 24, and executes the processes of steps S15 and S17. However, if audio output or screen display is not executed, the process in step S15 or S17 is skipped. In addition, in step S17, when the message box 120 is displayed on the display 32 for a predetermined time, the message box 120 is deleted (hidden).

In the first embodiment, the control process associated with the occurrence of an error and the control process associated with the resolution of an error are executed in separate flows. However, these processes can be executed in one flow as a process to update the error table 220.

Specifically, the processes of steps S11 to S19 may be performed subsequent to the processes of steps S1 to S5. In this case, if the process of step S5 is executed, the processing is advanced to step S11 without returning to step S1. In addition, when it is determined to be "NO" in step S11 and when the process of step S19 is executed, the processing is returned to step S1.

Alternatively, the processes of steps S1 to S5 may be performed subsequent to the processes of steps S11 to S19. In this case, if the process of step S19 is executed, the processing is advanced to step S1 without returning to step S11. In addition, when it is determined to be "NO" in step S1 and when the process of step S5 is executed, the processing is returned to step S11.

In addition, in the first embodiment, while only the notification of a message associated with the occurrence of an error and the resolution of the error is described, in fact, a message about the normal end of a job is also notified.

FIGS. 13 to 17 are flow diagrams illustrating an example of a main control process of the CPU 20 illustrated in FIG. 1.

When the power of the image forming apparatus 10 is turned on or when the power is recovered to the normal mode from the power saving mode, the CPU 20 starts the main control process, and in step S31, refers to the error table 220 to calculate the number of unresolved errors for each operation mode (in this first embodiment, for each of the copy mode, fax mode, and scan mode).

In the next step S33, the home screen 100 is displayed on the display 32, and in step S35, it is determined whether the mode selection button 102 is touched. In step S33, if there is no unresolved error, that is, if no error has occurred, such a home screen as the home screen 100 illustrated in FIG. 2 is displayed on the display 32. If there is an unresolved error, that is, if an error has occurred, the home screen 100, on which such a badge as the badge 106 illustrated in FIG. 4 is displayed, is displayed on the display 32.

Figure 14:
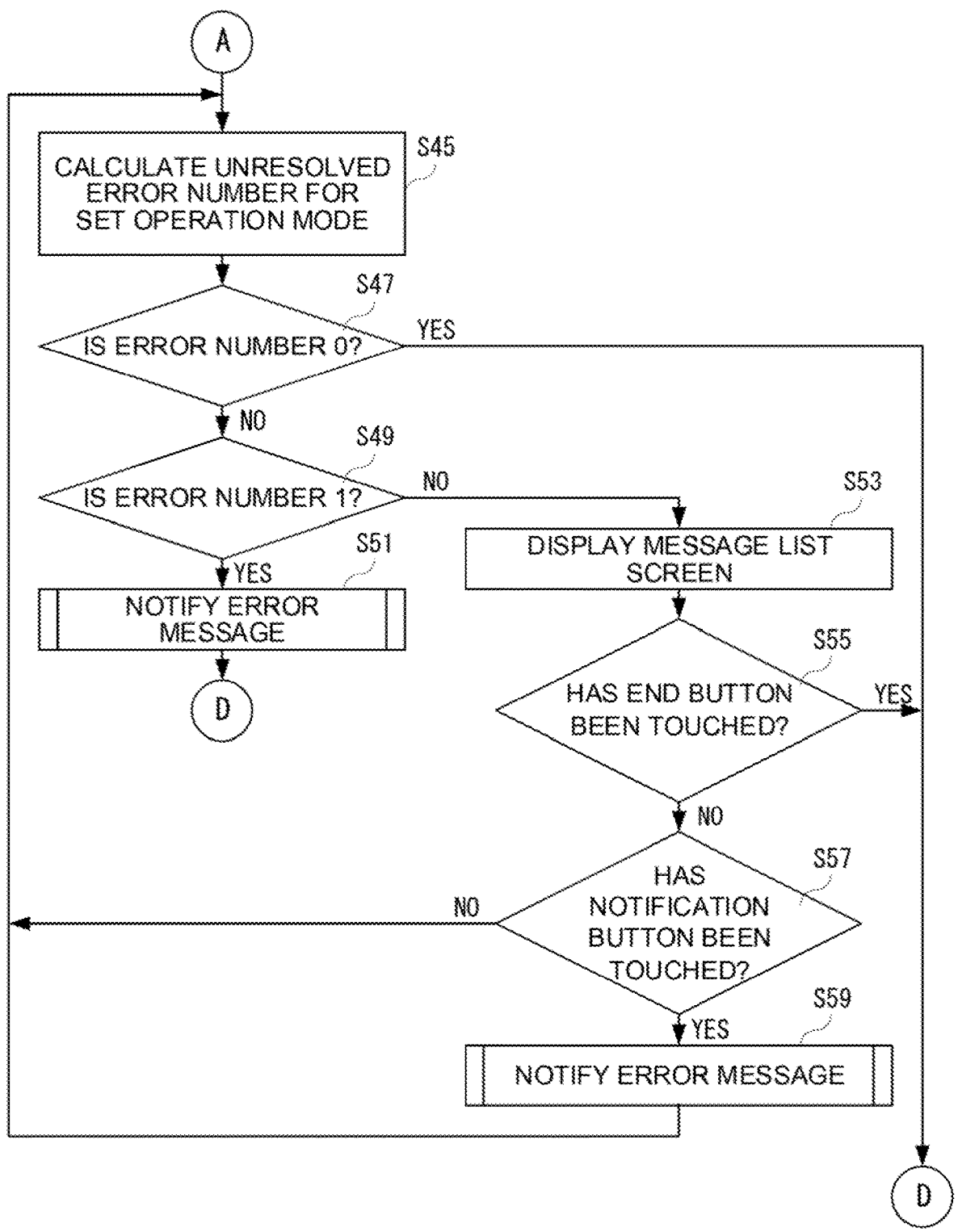
FIG. 14 is a flow diagram illustrating a second part of the main control process of the CPU of the image forming apparatus, which is subsequent to FIG. 13.

If "YES" in step S35, that is, if the mode selection button 102 is touched, an operation mode corresponding to the touched mode selection button 102 is set in step S37, and the processing is advanced to step S45 illustrated in FIG. 14. In step S37, the CPU 20 displays a screen for executing a job in the set operation mode on the display 32.

If "NO" in step S35, that is, if the mode selection button 102 has not been touched, it is determined whether there is a print instruction in step S39. In step S39, the CPU 20 determines whether a print job execution command (that is, a print instruction) and input image data has been received from a computer or a communication terminal on the network via the wired communicator 38. Alternatively, the CPU 20 also determines whether there is a print instruction for input image data by a user operation.

If "NO" in step S39, that is, if there is no print instruction, the processing is advanced to step S41. If "YES" in step S39, that is, if there is a print instruction, the processing is advanced to step S67 illustrated in FIG. 15.

In step S41, it is determined whether to start a fax communication. If "NO" in step S41, that is, if the fax communication is not to be started, the processing is advanced to step S43. If "YES" in step S41, that is, if the fax communication is to be started, the processing is advanced to step S67.

In step S43, it is determined whether the job status button 104 has been touched. If "NO" in step S43, that is, if the job status button 104 has not been touched, the processing is returned to step S33. If "YES" in step S43, that is, if the job status button 104 has been touched, the processing is advanced to step S73 illustrated in FIG. 16.

In step S45 illustrated in FIG. 14, the number of unresolved errors for the set operation mode is calculated, and in step S47, it is determined whether the number of errors calculated in step S45 is 0.

Figure 15:
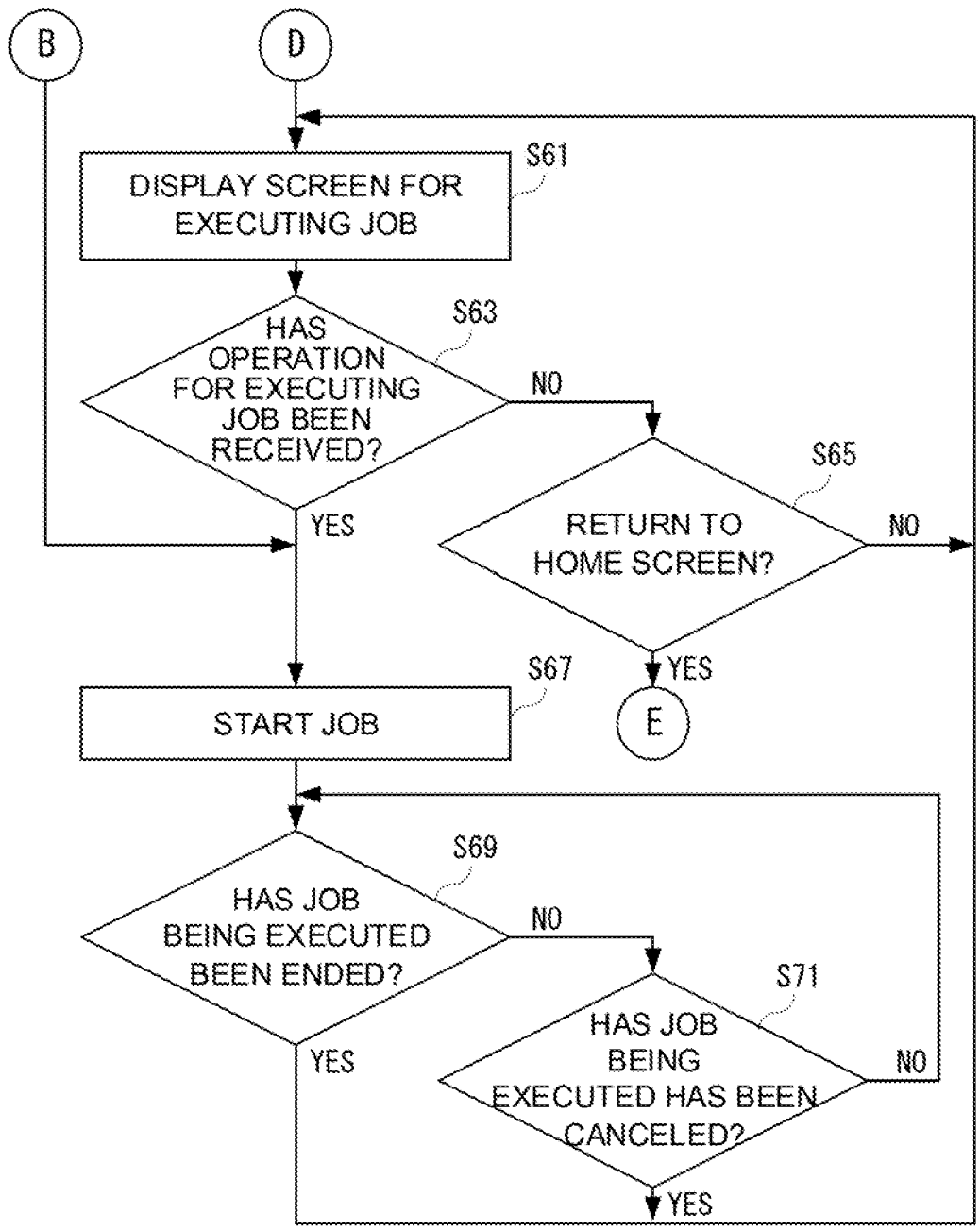
FIG. 15 is a flow diagram illustrating a third part of the main control process of the CPU of the image forming apparatus, which is subsequent to FIGS. 13 and 14.

If "YES" in step S47, that is, if the number of errors calculated in step S45 is 0, the processing is advanced to step S61 illustrated in FIG. 15. If "NO" in step S47, that is, the number of errors calculated in S45 is greater than 0, it is determined in step S49 whether the number of errors calculated in step S45 is 1.

If "NO" in step S49, that is, if the number of errors calculated in step S45 is not 1, the processing is advanced to step S53. If "YES" in step S49, that is, the number of errors calculated in step S45 is 1, an error message notification process described later is executed in step S51, and the processing is advanced to step S61.

In step S53, a message list screen for the operation mode, such as the message list screen 140 illustrated in FIG. 5, is displayed on the display. Note that, on the message list screen 140, the contents of errors in the operation mode set in step S37 are displayed in a list. In doing so, the CPU 20 refers to the error table 220 to acquire the content of an error.

In the following step S55, it is determined whether the end button 150 has been touched. If "NO" in step S55, that is, if the end button 150 has not been touched, the processing is returned to step S57. If "YES" in step S55, that is, if the end button 150 has been touched, the processing is advanced to step S61. In doing so, the message list screen 140 is hidden.

In step S57, it is determined whether the notification button 146 has been touched. If "NO" in step S57, that is, if the notification button 146 has not been touched, the processing is returned to step S45. If "YES" in step S57, that is, if the notification button 146 has been touched, the error message notification process for the error corresponding to the notification button 146 is executed in step S59, and the processing is returned to step S45. If "NO" in step S57, when the message list screen 140 is displayed on the display 32 and the error has not been resolved, the processing may be returned to step S53 instead of step S45.

Subsequently, in step S61, a screen for executing a job is displayed on the display 32, and in step S63, it is determined whether an operation for executing the job has been received. If "NO" in step S63, that is, if the operation for executing the job has not been received, it is determined in step S65 whether the screen returns to the home screen 100. Here, the CPU 20 determines whether the home button has been operated.

If "NO" in step S65, that is, if the screen does not return to the home screen 100, the processing is returned to step S61. If "YES" in step S65, that is, if the screen returns to the home screen 100, the processing is returned to step S31 illustrated in FIG. 13.

Although illustrations and the like are omitted, when a screen for executing various settings (herein referred to as "setting screen") is selected to be displayed on the screen for executing a job of each operation mode, the setting screen is displayed, and various settings are executed in accordance with the operation of the user. For example, the various settings include sheet number setting, paper setting, print density setting and scaling setting in the copy mode, setting (or selection) of the destination in the fax mode, and setting of the save destination in the scan mode.

In addition, if "YES" in step S63, that is, if an operation for executing a job has been received, the job is started in step S67. Here, the print job, fax job, scan job or the like is started. Each job is executed in parallel with the main control process. Since these jobs are already well known, the illustration and detailed description are omitted.

In the following step S69, it is determined whether the job being executed has been ended. If "NO" in step S69, that is, if the job being executed has not been ended, the processing is advanced to step S71. If "YES" in step S69, that is, if the job being executed has been ended, the processing is returned to step S61.

In step S71, it is determined whether the job being executed is canceled. If "NO" in step S71, that is, if the job being executed is not canceled, the processing is returned to step S69. If "YES" in step S71, that is, if the job being executed has been ended, the processing is returned to step S61.

Figure 16:
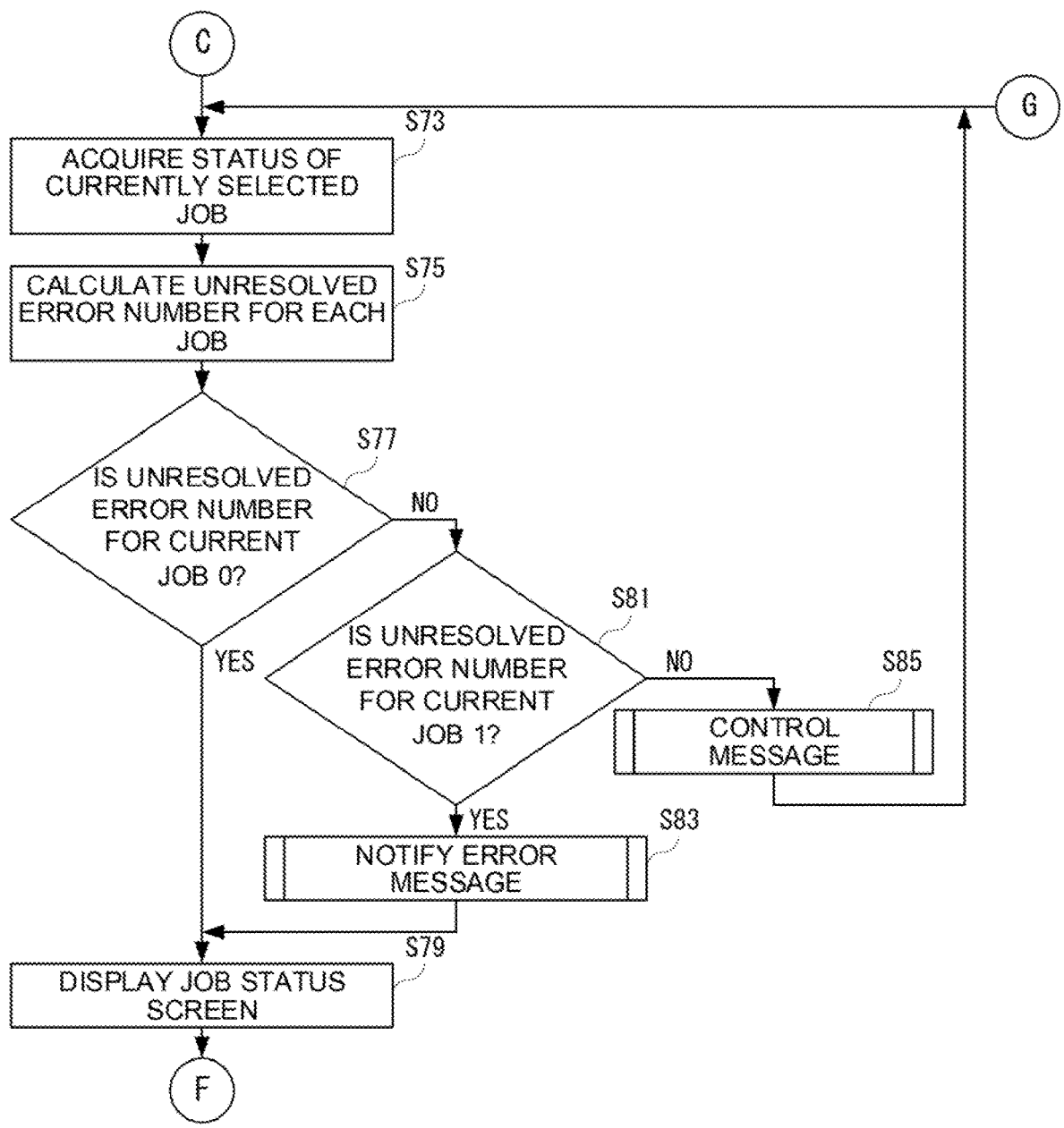
FIG. 16 is a flow diagram illustrating a fourth part of the main control process of the CPU of the image forming apparatus, which is subsequent to FIG. 13.

As described above, when the job status button 104 is touched on the home screen 100, the status of the currently selected job is acquired in step S73 illustrated in FIG. 16. Note that, when the job status button 104 is touched, initially, the print job is selected as the currently selected job.

In the following step S75, the number of unresolved errors for each job is calculated. In step S75, the CPU 20 refers to the error table 220 and counts the number of errors for each job. Hereinafter, the same applies to the case of detecting an unresolved error for each job.

In the following step S77, it is determined whether the number of unresolved errors of the currently selected job is 0. If "YES" in step S77, that is, the number of unresolved errors of the currently selected job is 0, the job status screen 160 is displayed on the display 32 in step S79, and the processing is advanced to step S87 illustrated in FIG. 17.

However, in step S79, if there is no unresolved error, that is, if no error has occurred, the job status screen 160, on which the badge 166 is not displayed, is displayed on the display 32. If there is an unresolved error, that is, if an error has occurred, the job status screen 160, on which such a badge as the badge 166 illustrated in FIG. 6 is displayed, is displayed on the display 32. Note that, the badge 166 is displayed for each job. In this specification, the same applies to all the cases when the job status screen 160 is displayed on the display 32.

If "NO" in step S77, that is, if the number of unresolved errors for the currently selected job is not 0, it is determined whether the number of unresolved errors for the currently selected job is 1 in step S81. If "YES" in step S81, that is, if the number of unresolved errors for the currently selected job is 1, the error message notification process is executed in step S83, and the processing is advanced to step S79. If "NO" in step S81, that is, if the number of unresolved errors for the currently selected job is not 1, a message control process (see FIG. 18) described later is executed in step S85, and the processing is returned to step S73.

Figure 17:
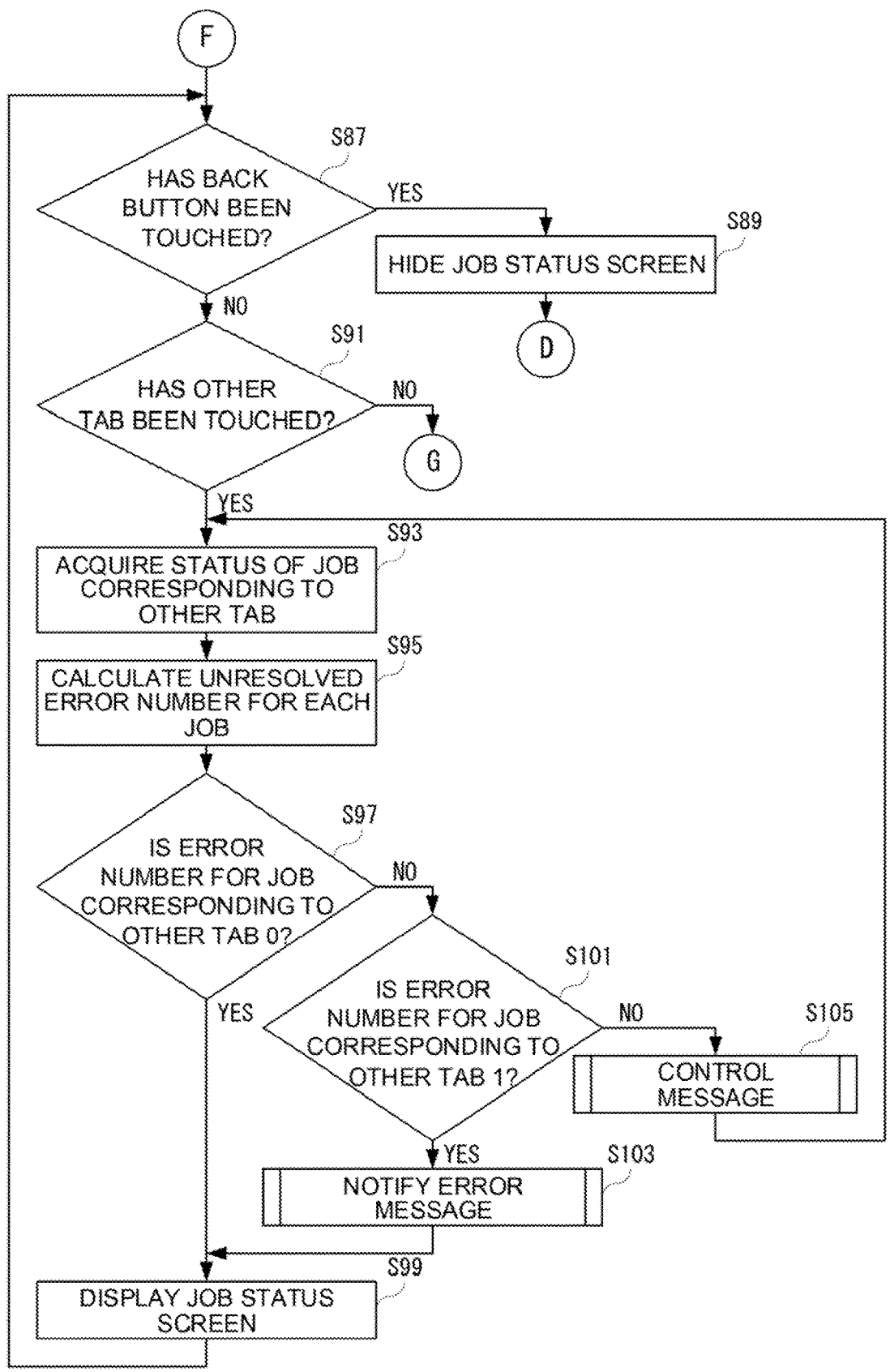
FIG. 17 is a flow diagram illustrating a fifth part of the main control process of the CPU of the image forming apparatus, which is subsequent to FIG. 16.

As illustrated in FIG. 17, in step S87, it is determined whether the back button 164 has been touched. If "YES" in step S87, that is, if the back button 164 has been touched, the job status screen 160 is hidden in step S89, and the processing is returned to step S61 illustrated in FIG. 15. If "NO" in step S87, that is, if the back button 164 has not been touched, it is determined whether a different tab 162 has been touched in step S91.

If "NO" in step S91, that is, if a different tab 162 has not been touched, the processing is returned to step S73. If "YES" in step S91, that is, a different tab 162 has been touched, in step S93, the status of the job corresponding to the different tab 162 determined to have been touched in step S91 is acquired, and in step S95, the number of unresolved errors is calculated for each job.

In the following step S97, it is determined whether the number of unresolved errors for the job corresponding to the different tab 162 determined to have been touched in step S91 is 0. If "YES" in step S97, that is, if the number of unresolved errors for the job corresponding to the different tab 162 determined to have been touched in step S91 is 0, the job status screen 160 is displayed on the display 32 in step S99, and the processing is returned to step S87.

If "NO" in step S97, that is, if the number of unresolved errors for the job corresponding to the different tab 162 determined to have been touched in step S91 is not 0, in step S101, it is determined whether the number of unresolved errors for the job corresponding to the different tab 162 determined to have been touched in step S91 is 1.

If "YES" in step S101, that is, if the number of unresolved errors for the job corresponding to the different tab 162 determined to have been touched in step S91 is 1, the error message notification process is executed in step S103, and the processing is advanced to step S99. If "NO" in step S101, that is, if the number of unresolved errors for the job corresponding to the different tab 162 determined to have been touched in step S91 is not 1, a message control process is executed in step S105, and the processing returns to step S93.

In steps S93 to S105, "the job corresponding to the different tab 162 determined to have been touched in step S91" is described for convenience of explanation, and this "job corresponding to the different tab 162" corresponds to the "currently selected job" described above.

Figure 18:
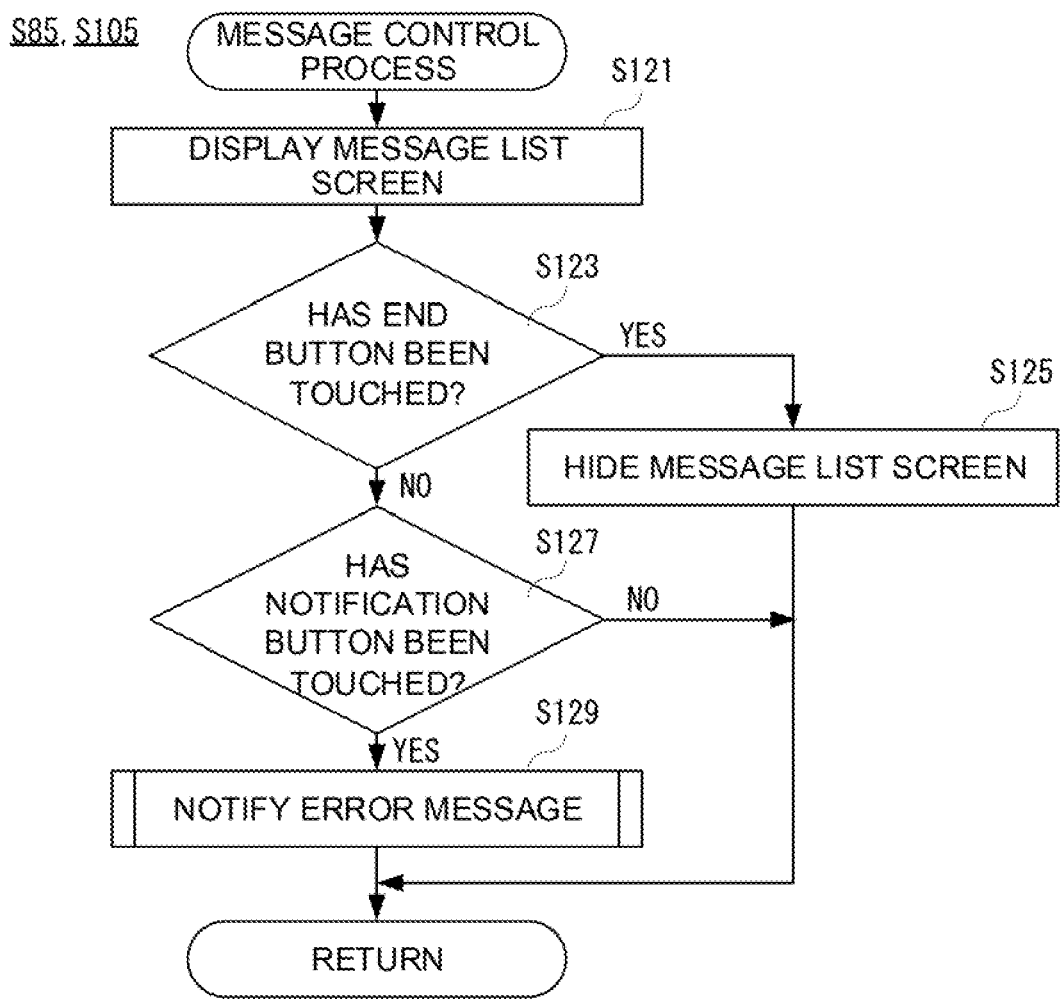
FIG. 18 is a flow diagram illustrating an example of a message control process of the CPU of the image forming apparatus.

FIG. 18 is a flow diagram illustrating an example of a message control process of the CPU 20 illustrated in FIG. 1.

As illustrated in FIG. 18, when starting the message control process, the CPU 20 displays such a message list screen as the message list screen 140 illustrated in FIG. 5 on the display 32 in step S121.

In the next step S123, it is determined whether the end button 150 has been touched. If "YES" in step S123, that is, if the end button 150 has been touched, the message list screen 140 is hidden in step S125, and the message control process is ended and the processing is returned to the main control process.

If "NO" in step S123, that is, if the end button 150 has not been touched, it is determined whether the notification button 146 has been touched in step S127. If "NO" in step S127, that is, if the notification button 146 has not been touched, the message control process is ended and the processing is returned to the main control process.

If "YES" in step S127, that is, if the notification button 146 has been touched, the error message notification process corresponding to the notification button 146 determined to have been touched in step S127 is executed in step S129, the message control process is ended, and the processing is returned to the main control process.

Figure 19:
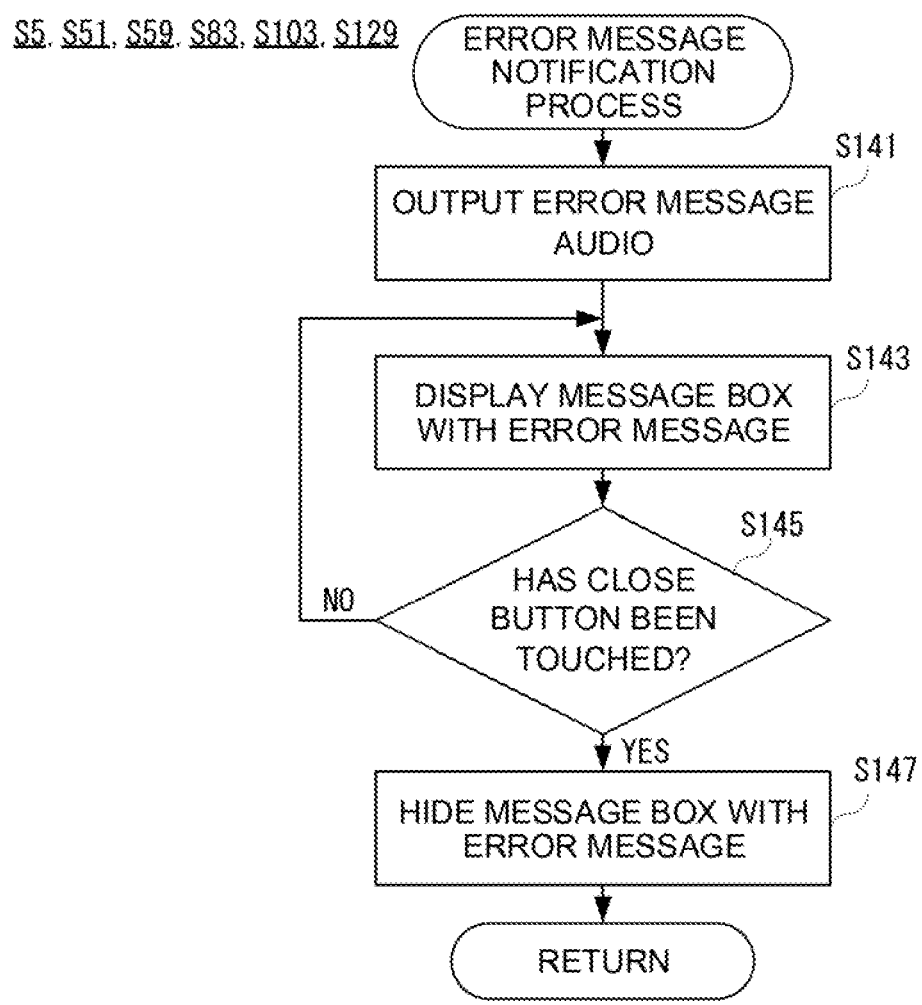
FIG. 19 is a flow diagram illustrating an example of an error message notification process of the CPU of the image forming apparatus.

FIG. 19 is a flow diagram illustrating an example of an error message notification process of the CPU 20 illustrated in FIG. 1.

As illustrated in FIG. 19, when starting the error message notification process, the CPU 20 outputs the error message audio from the audio outputter 42 in step S141, and displays the message box 120 in which the error message is described, on the display 32 in step S143. Note that, the CPU 20 reads the audio data and text data, which are linked to the notification ID corresponding to the error message to be notified, from the message data 404c in the RAM 24, and executes the processes of steps S141 and S143. However, when the audio output or the screen display is not executed, the process of step S141 or S143 is skipped.

In the following step S145, it is determined whether the close button 124 has been touched. If "NO" in step S145, that is, if the close button 124 has not been touched, the processing is returned to step S143. If "YES" in step S145, that is, if the close button 124 has been touched, the message box 120 in which the error message is described is hidden in step S147. The error message notification process is ended, and the processing is returned to the control process associated with the occurrence of an error illustrated in FIG. 11, the main control processes illustrated in FIGS. 13 to 17, or the message control process illustrated in FIG. 18.

According to the first embodiment, the number of unresolved errors is visually displayed in the badges 106 and 166 until the unresolved errors are resolved. Therefore, even if an error message is not displayed, it is easy to know that there is an unresolved error.

In addition, according to the first embodiment, the user is re-notified of an unresolved error if touching the mode selection button 102 or the tab 162, on which the badge 106 or 166 is displayed. Therefore, even if an error message is not displayed, it is possible to confirm the content of an unresolved error if necessary.

In the first embodiment, only the case has been described in which the job status screen 160 is displayed in response to the job status button 104 being touched, which is provided in the home screen 100. However, the present invention is not limited to this. The job status screen 160 may be displayed by a touch operation on an execution screen in each operation mode.

In addition, in the first embodiment, while the number of unresolved errors is displayed in a badge, as long as the number of unresolved errors is visible, a number may simply be displayed.

Furthermore, in the first embodiment, while the number of unresolved errors for each operation mode is displayed in the image forming apparatus 10 in which a plurality of operation modes can be selected. However, if there is only one operation mode (for example, only copy, only fax, only print, or only scan), there is no need to select the operation mode, and thus the number of unresolved errors may be displayed visually on the key or button of the software for starting a job (for example, a start button) or in the vicinity of the key or button.

Second Embodiment

In an image forming apparatus 10 of a second embodiment, when a user handles, in phases, an error that has occurred, the contents of handling are the same as those on the image forming apparatus 10 of the first embodiment except that an error message is notified and a badge is displayed according to a phase. Thus, different contents will be described, and redundant contents will be omitted or simply described.

In the second embodiment, the case where the user handles an error in phases is a case where a provisional action is taken for an error that has occurred in a first phase and a fundamental action is taken to resolve the error in a second phase.

For example, if an error occurs due to running out of sheets in a paper tray 1, assigning another paper tray to the remaining print job which is not completed corresponds to the provisional action, and replenishing sheets in the paper tray 1 corresponds to the fundamental action. In this case, the print job is completed with the use of sheets set in the paper tray as assigned.

In addition, when an error of replacement of a toner occurs, ordering a toner cartridge from a dealer corresponds to the provisional action, and replacing the toner cartridge after the out of toner occurs corresponds to the fundamental action.

In addition, when an error occurs due to a failure of a finisher (option device) (for example, all functions can be used except for the binding function), requesting repair from a dealer corresponds to the provisional action, and the repair of the finisher by the dealer corresponds to the fundamental action.

These are only examples, to which the present invention is not to be limited. In addition, whether to cope with an error in phases is predetermined for each error.

Hereinafter, in the second embodiment, an error that can be resolved without coping with the error in phases is referred to as a first error, and an error that may be resolved by coping with the error in phases is referred to as a second error. In the case of the second error, however, a fundamental action may be taken without taking a provisional action if sheet replenishment or toner cartridge replacement is quickly done.

For the first error, the same error message notification and the display of the badge 106 are performed as in the case described in the first embodiment, and thus the redundant description will be omitted.

In the second embodiment, when the second error occurs, until the first phase is resolved, that is, if the first phase is unresolved yet, an error message that includes a message prompting the resolution of the first phase is notified. In addition, if the first phase is resolved, that is, if the second phase is unresolved, an error message that does not include a message prompting the resolution of the first phase is notified.

Figure 20:
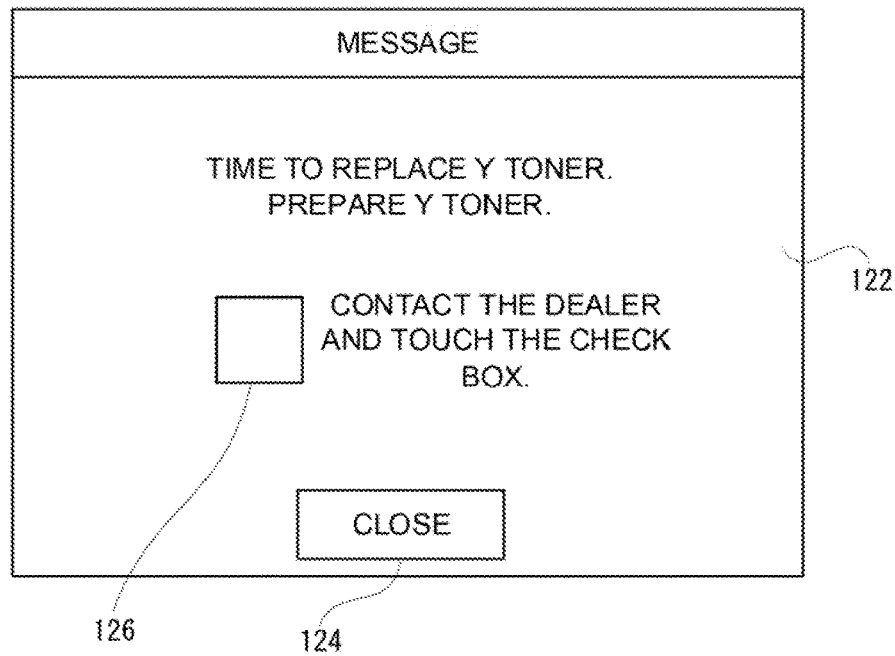
FIG. 20 is a diagram illustrating an example of a message box displayed on a display of an image forming apparatus according to a second embodiment.

FIG. 20 is a diagram illustrating an example of the message box 120 displayed on the display 32 when the second error occurs. Note that, when an error message is re-notified for the second error in which the first stage has not been resolved, the same message box 120 is displayed.

In the message box 120 illustrated in FIG. 20, a message prompting the resolution of the first phase, a message prompting the user to touch a check box 126, and a check box 126 for inputting that the first phase has been resolved are further displayed in the message display area 122 in the message box 120 illustrated in FIG. 3. However, in order to display the message prompting the resolution of the first phase and the check box 126, a message prompting the resolution of the second phase (the error message described in the first embodiment) is displayed in (or moved to) the upper part of the message display area 122.

Until the first phase is resolved, a blank check box 126 is displayed in the message box 120, and when the first phase is resolved, the user touches the check box 126. When the check box 126 is touched, a check mark is displayed in the frame of the check box 126. When the check mark is displayed in the frame of the check box 126, the image forming apparatus 10 determines that the first phase has been resolved. Therefore, in the second embodiment, when the first phase is resolved, until the second phase is resolved, the image forming apparatus 10 notifies an error message that does not include a message prompting the resolution of the first phase when notifying an error message. The notification of the error message that does not include the message prompting the resolution of the first phase is the same as the error message notification of the first embodiment, and thus the redundant description will be omitted.

In addition, if the second error occurs, an error message that includes a message prompting the resolution of the first phase is output as audio. Moreover, if the second error occurs, when the first phase is resolved, the audio of the resolution message that the first phase has been resolved is output. Furthermore, when the second phase is resolved, the audio of the resolution message that the second error has been resolved is output.

However, depending on the content of the second error, the resolution message may not be notified even if the first phase or second phase is resolved. This is predetermined by a notification table 200 (see FIG. 23) of the second embodiment described later.

Figure 21:
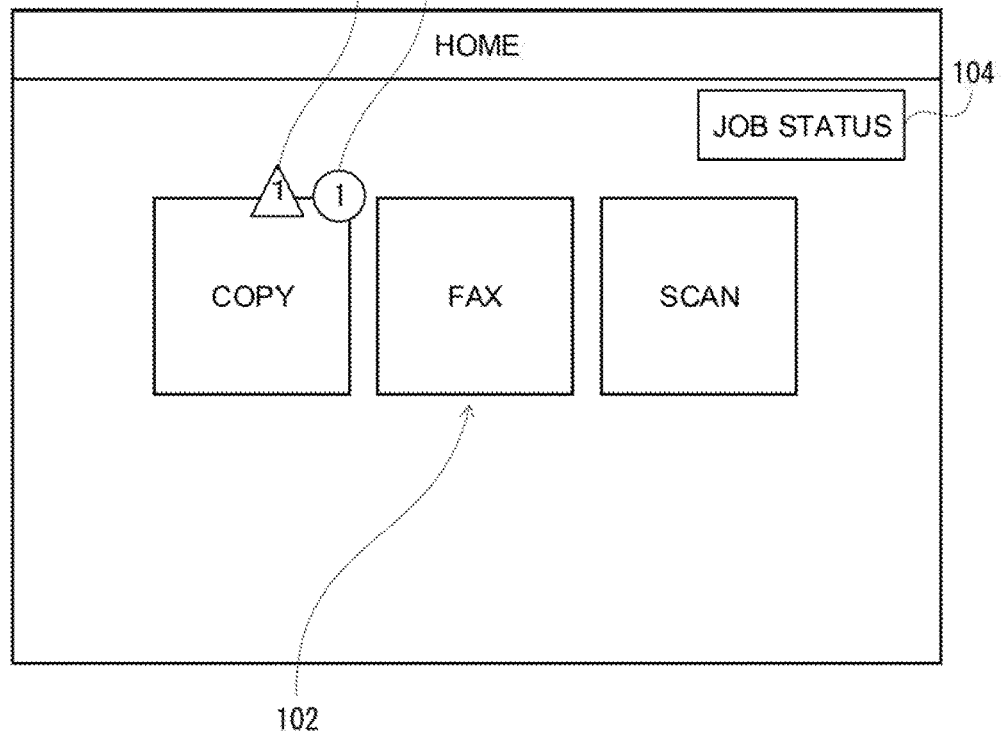
FIG. 21 is a diagram illustrating an example of a home screen displayed on the display of the image forming apparatus according to the second embodiment.

FIG. 21 is an example of a home screen 100 in the second embodiment. In the home screen 100 illustrated in FIG. 21, a badge 108 is further displayed on the home screen 100 illustrated in FIG. 4. The badge 108 is an image for displaying the number of errors in each of which the first phase has not been resolved in the operation mode corresponding to the mode selection button 102 on which the badge 108 is overlapped and displayed.

In the example illustrated in FIG. 20, the badge 108 is illustrated with the use of a triangle-shaped figure in order to be distinguished from the badge 106. However, the shape and the color of the badge 108 need not be limited to this. As long as the badge 108 can be distinguished from the badge 106, the same shape and a different color may be used, or a different shape and a different color may be used.

The method for notifying the error message when the mode selection button 102 is touched is the same as that of the first embodiment. However, in the case of the second error, an error message according to an error status is notified. In other words, in the case of the second error, a different error message is notified when the first phase is unresolved and when the second phase is unresolved.

As described above, in the case of the second error, the error may be resolved in two phases, and the number of errors in each of which the first phase has not been resolved is indicated by the badge 108, and the number of errors in each of which the second phase has not been resolved is displayed in the badge 106. However, the number of first errors is also displayed in the badge 106.

Therefore, in the badge 106, the number of second errors in each of which the second phase has not been resolved is added to the number of first errors and displayed. In addition, in the badge 108, the number of second errors in each of which the first phase has not been resolved is displayed.

For example, in the second error, when the first phase is resolved, the count displayed in the badge 108 is subtracted by 1, and the count displayed in the badge 106 is incremented by 1.

However, even in the case of the second error, the first phase may not be resolved and the second phase may be resolved. In such a case, the second error is resolved, and thus the count displayed in the badge 108 is subtracted by 1, but the count displayed in the badge 106 is not changed.

Figure 22:
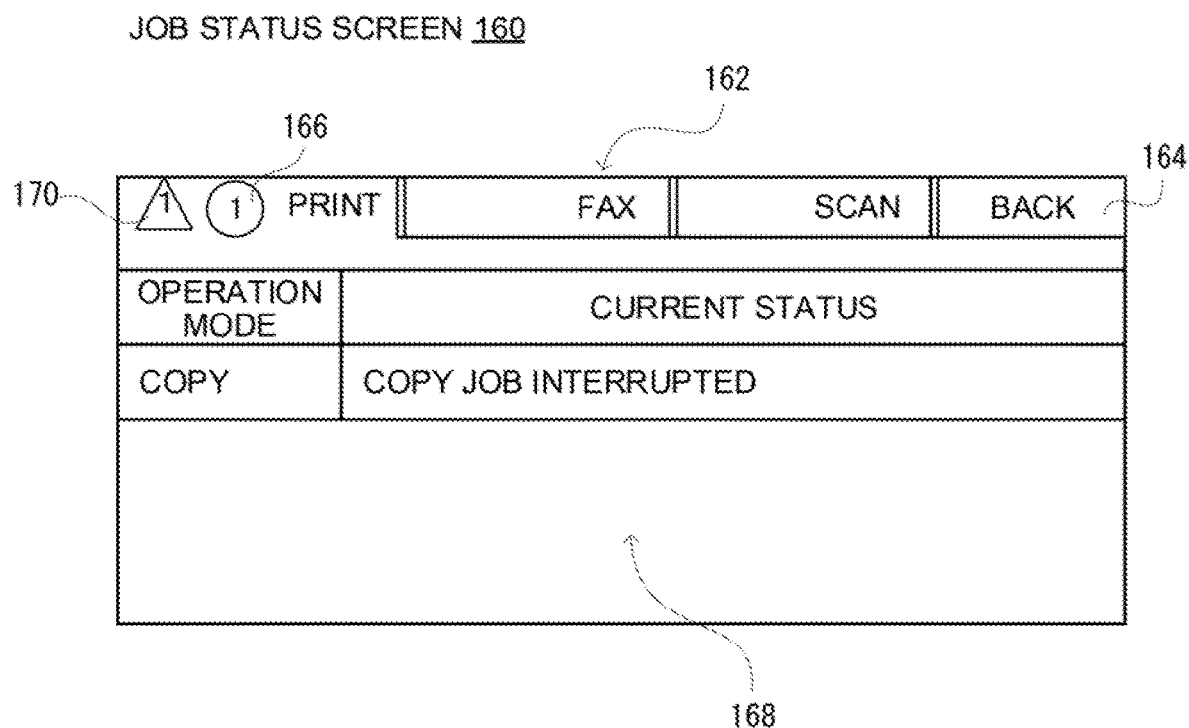
FIG. 22 is a diagram illustrating an example of a job status screen displayed on the display of the image forming apparatus according to the second embodiment.

FIG. 22 is an example of the job status screen 160 in the second embodiment. Also, in the second embodiment, when the job status button 104 is touched on the home screen 100, the job status screen 160 is displayed on the display 32. In addition, in doing so, the copy job is selected as is the case with the first embodiment.

In the job status screen 160 illustrated in FIG. 22, a badge 170 is further displayed on the job status screen 160 illustrated in FIG. 6. The badge 170 is an image for displaying the number of second errors in each of which the first phase has not been resolved as is the case with the badge 108 described above.

In the job status screen 160 of the second embodiment, the badge 170 is displayed in the same manner as the badge 166. In the example illustrated in FIG. 22, the badge 170 is on the tab 162 and displayed on the left side of the badge 166. However, the badge 166 may not be displayed.

When a tab 162 (different tab 162) corresponding to a different job that is different from the currently selected job is touched on the job status screen 160, an error message is notified as described in the first embodiment. However, if the number of unresolved errors in the different job is 2 or more, such a message list screen as the message list screen 140 illustrated in FIG. 5 is displayed, and an error message selected on this message list screen is notified. However, the number of unresolved errors is the sum (total) of the number of unresolved first errors and the number of unresolved second errors, and in the message list screen 140, the notification buttons 146 for both the first error and the second error are displayed in the display area 144.

As described above, in the second embodiment, for the second error, the error is resolved in phases, and an error message according to a phase is notified. Therefore, as illustrated in FIG. 23, in the notification table 200 of the second embodiment, an error status column is further provided in the notification table 200 of the first embodiment illustrated in FIG. 7, and for the second error, the error message notification method and the resolution message notification method are described depending on an error status.

In the second embodiment, the error status is also described in the case of the first error. However, for the first error, the error status is only unresolved, and there is also no need to determine the error status, and thus the error status may be omitted. The same applies to an error table 220 of the second embodiment described later.

As illustrated in FIG. 23, in the second embodiment, the replacement of Y toner corresponds to the second error, and when the error status is unresolved first phase, the error message notification method is audio/screen display, and the resolution message notification method is no notification. In addition, in the replacement of Y toner, if the error status is unresolved second phase, the error message notification method is audio/screen display, and the resolution message notification method is audio/screen display.

As is the case with the first embodiment, the error message and the resolution message to be notified are predetermined in accordance with the error status, and the audio data and text data corresponding to each message are stored.

In addition, as illustrated in FIG. 24, in the error table 220 of the second embodiment, an error status column is further provided in the error table 220 of the first embodiment illustrated in FIG. 8, and it is described for the second error that the second error is not resolved in the first phase or the second phase.

In the second embodiment, when the badges 106, 108, 166, and 170 are displayed, the error status is referred to, and for each operation mode or job, the number of errors not resolved in the first phase and the number of other errors are calculated.

In the second embodiment, when the second error occurs and the check box 126 is not touched in the message box 120 displayed on the display 32 due to the second error and the message box 120 is closed, if this second error is registered in the error table 220, unresolved first phase is described as the error status. In addition, when the first phase is resolved, the error status of the corresponding second error is rewritten to unresolved second phase. However, when the second error is resolved, the second error is deleted from the error table 220 regardless of the error status.

In the second embodiment, among the programs of the first embodiment illustrated in FIG. 9, in some programs, a process is added or a process is changed. In the error table update program 402i, a process for registering the error status is executed, and in the case of the second error, a process for updating the error status is further executed. In the message notification program 402j, a message notification process according to the error status is executed. In the error number calculation program 402k, for each operation mode or each job, the number of second errors in each of which the first phase has not been resolved and the number of other errors (the number of second errors in each of which the second phase has not been resolved and the number of first errors) are calculated separately.

In addition, in the second embodiment, the message data 404c includes, in the case of the second error, audio data and text data for an error message and a resolution message according to the first phase and second phase.

Furthermore, in the second embodiment, the notification table data 404d is data for the notification table 200 illustrated in FIG. 23. The error table data 404e is data for the error table 220 such as that illustrated in FIG. 24. In addition, the error number data 404f is data about the number of second errors in each of which the first phase has not been resolved and the number of other errors (the number of second errors in each of which the second phase has not been resolved and the number of first errors) that are calculated for each operation mode or each job.

Hereinafter, the control process associated with the occurrence of an error, the control process associated with the resolution of an error, the main process, the message control process, and the error message notification process in the second embodiment will be described. The description of the same content as in the first embodiment will be omitted or simply described.

Figure 25:
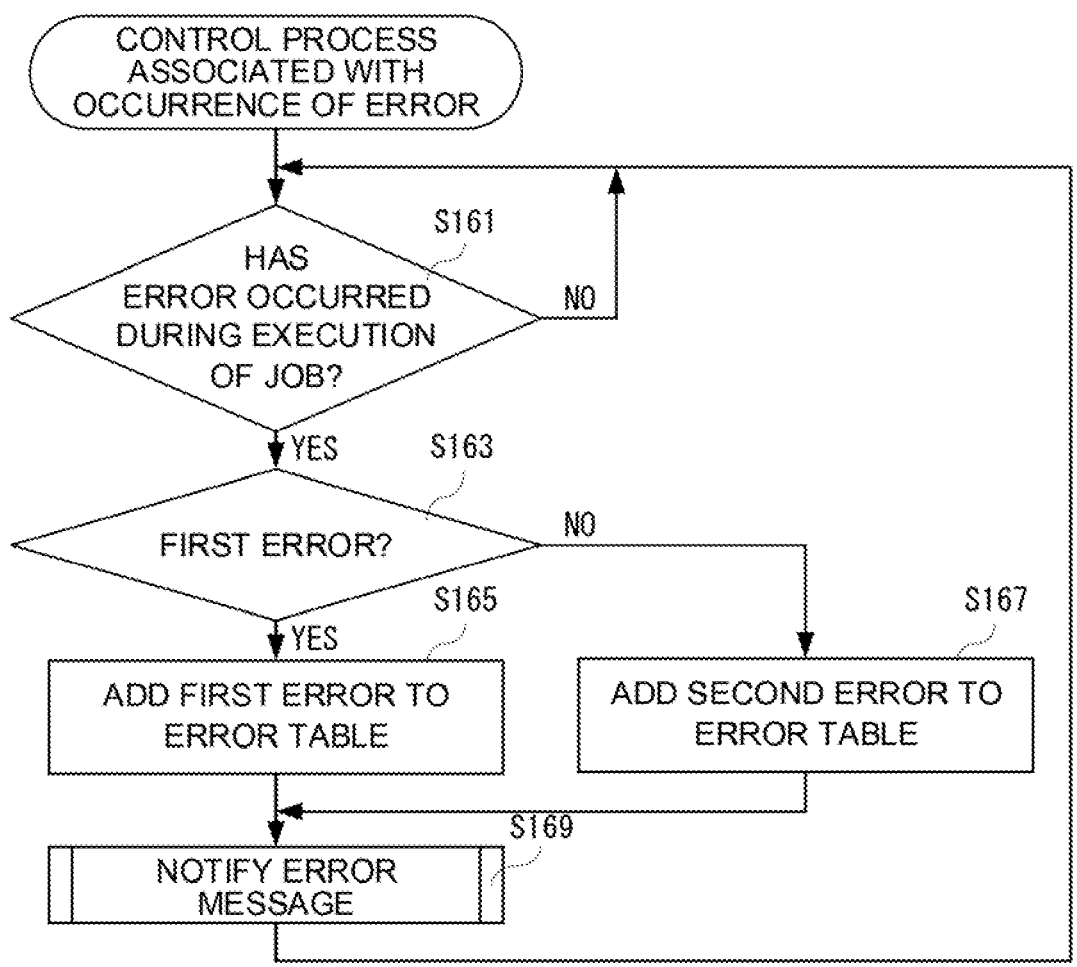
FIG. 25 is a flow diagram illustrating an example of a control process of a CPU of the image forming apparatus according to the second embodiment, which process is associated with an occurrence of an error.

FIG. 25 is a flow diagram illustrating an example of a control process of the CPU 20 of the image forming apparatus 10 according to the second embodiment, which is associated with an occurrence of an error.

As illustrated in FIG. 25, when starting a control process associated with an occurrence of an error, the CPU 20 determines in step S161 whether an error has occurred during execution of a job. If "NO" in step S161, that is, if no error has occurred during the execution of the job, the processing is returned to step S161.

If "YES" in step S161, that is, if an error has occurred during the execution of the job, it is determined in a step S163 whether the first error has occurred. Here, when an error occurs, the CPU 20 refers to the notification table 200 and determines that the error is the first error when the error status corresponding to the error is described in one phase, and determines that the error is the second error when the error status is described in two phases.

If "YES" in step S163, that is, if the error is the first error, the first error is added (or registered) to the error table 220 in step S165, and an error message notification process described later (see FIG. 28) is executed in step S169, and the processing is returned to step S161. If "NO" in step S163, that is, if the error is the second error, the second error is added (or registered) to the error table 220 in step S167, and the processing is advanced to step S169.

Figure 26:
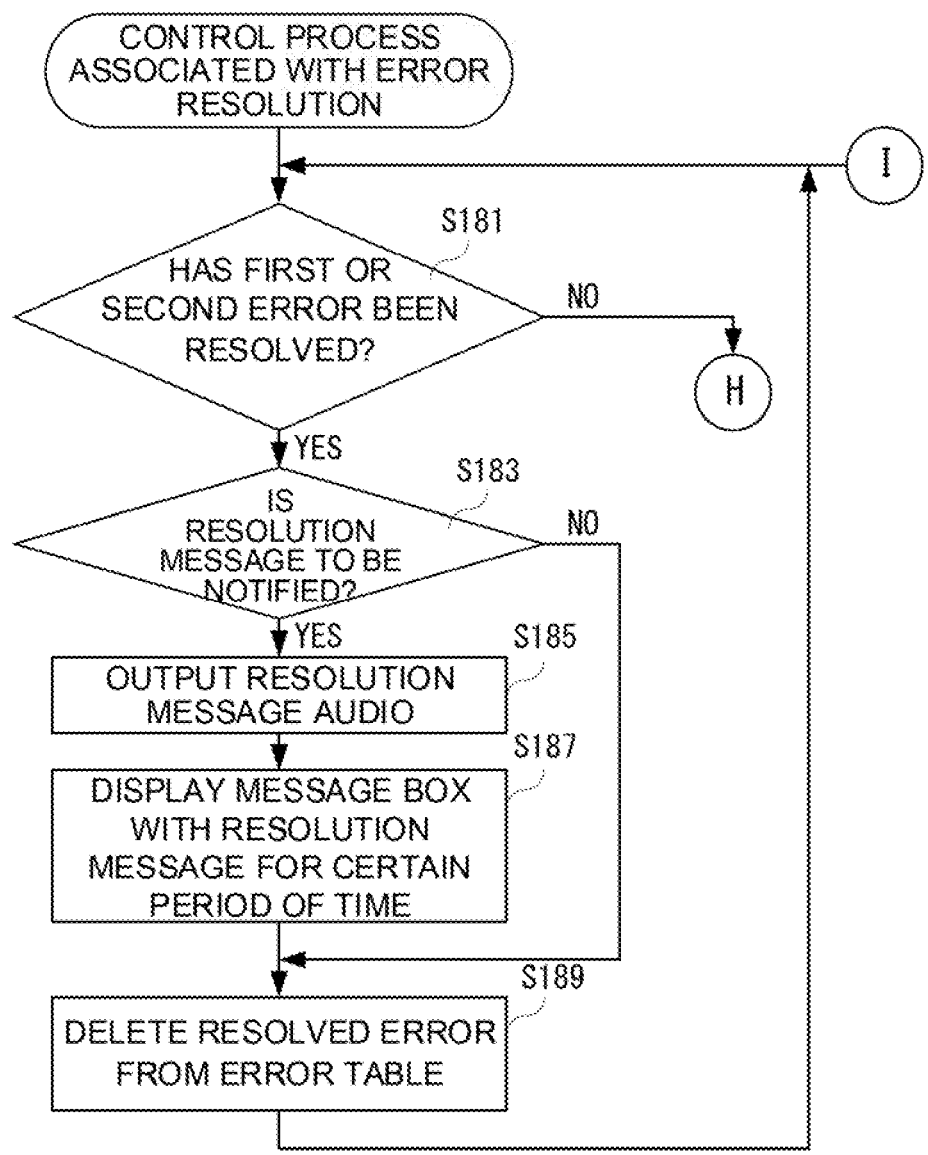
FIG. 26 is a flow diagram illustrating a part of an example of a control process of the CPU of the image forming apparatus according to the second embodiment, which is associated with the resolution of an error.
Figure 27:
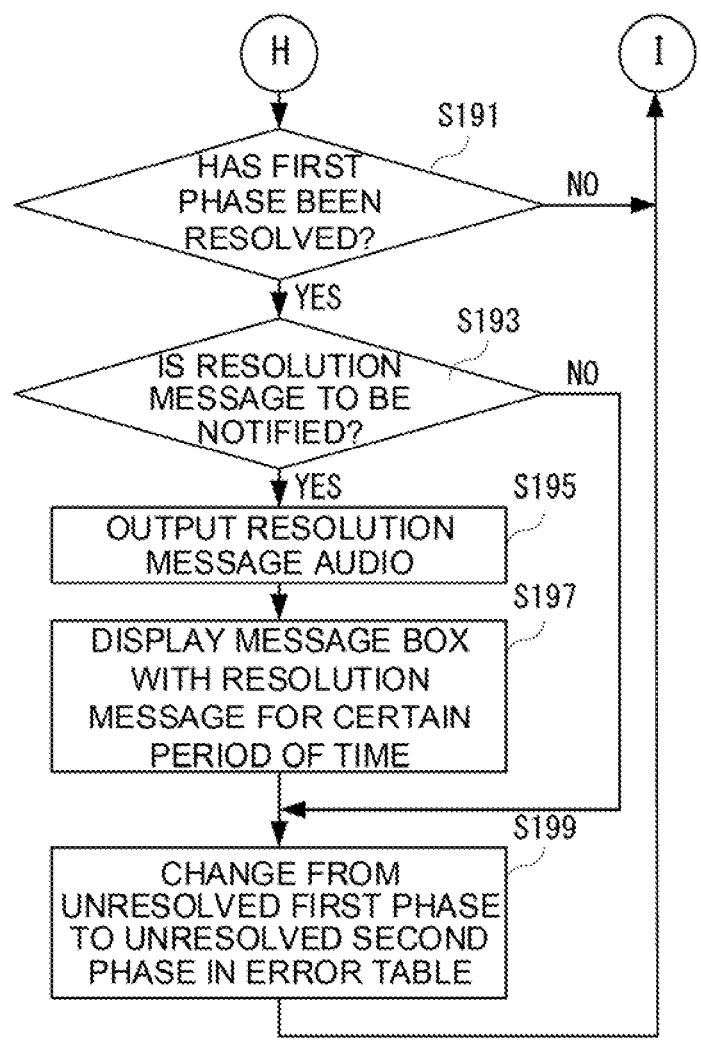
FIG. 27 is another part of a control process of the CPU of the image forming apparatus according to the second embodiment, which is associated with the resolution of an error and is subsequent to FIG. 26.

FIGS. 26 and 27 are flow diagrams illustrating an example of a control process of the CPU 20 of the image forming apparatus 10 according to the second embodiment, which is associated with the resolution of an error.

As illustrated in FIG. 26, when starting a control process associated with the resolution of an error, in step S181, the CPU 20 determines whether the first error or second error has been resolved. If "NO" in step S181, that is, if neither the first error nor the second error has been resolved, the processing is advanced to step S191 illustrated in FIG. 27.

If "YES" in step S181, it is determined whether a resolution message is notified in step S183. Here, the CPU 20 refers to the notification table 200 and determines that whether a method other than "no notification" is described in the column of resolution message notification method in correspondence with the first error or second error determined to have been resolved in step S181.

If "NO" in step S183, that is, if the resolution message is not to be notified, the processing is advanced to step S189. If "YES" in step S183, when the resolution message is notified, the audio of the resolution message is output in step S185, and the message box 120 in which the resolution message is described is displayed on the display 32 for a certain period of time in step S187. Then, in step S189, the resolved error is deleted from the error table 220, and the processing is returned to step S181.

As described above, if "NO" in step S181, it is determined whether the first phase is resolved in the second error in step S191 illustrated in FIG. 27. Here, it is determined whether the check box 126 in the message box 120 has been touched and the check mark has been displayed.

If "NO" in step S191, that is, if the first phase has not been resolved in the second error, the processing is returned to step S181 illustrated in FIG. 26. If "YES" in step S191, that is, if the first phase has been resolved in the second error, it is determined in step S193 whether a resolution message is to be notified. If "NO" in step S193, that is, if the resolution message is not to be notified, the processing is advanced to step S199. If "YES" in step S193, that is, if the resolution message is to be notified, the audio of the resolution message is output in step S195, and the message box 120 in which the resolution message is described is displayed on the display 32 for a certain period of time in step S197. The CPU 20 acquires, from the message data 404c, the audio data and text data corresponding to the unresolved first phase among the audio data and text data linked to the notification ID corresponding to the second error including the resolved first phase, and executes processes of steps S195 and S197. However, when the audio output or the screen display is not executed, the process of step S195 or 197 is skipped. Then, in step S199, the error status for the error in which the first phase has been resolved in the error table 220 is changed from unresolved first phase to unresolved second phase, and the processing is returned to step S181.

With respect to the main control process of the second embodiment, the contents are the same as those of the main control process of the first embodiment except that when the home screen 100 is displayed, the badge 108 is further displayed, and when the job status screen 160 is displayed, the badge 170 is further displayed, and the calculation method of the number of unresolved errors for displaying these badges differs from that of the first embodiment.

That is, in the second embodiment, in step S31, the CPU 20 calculates separately, for each operation mode, the number of second errors in each of which the first phase has not been resolved and the number of other errors (the number of second errors in each of which the second phase has not been resolved and the number of first errors). In addition, when the home screen 100 is displayed in step S33, for each mode selection button 102, a part of the badge 108 in which the number of errors, in each of which the first phase has not been resolved, is described is caused to overlap with the corresponding mode selection button 102 and displayed, and a part of the badge 106 in which the number of other errors is described is caused to overlap with the corresponding mode selection button 102 and displayed.

Similarly, in the second embodiment, in steps S75 and S95, the CPU 20 calculates separately, for each job, the number of second errors in each of which the first phase has not been resolved and the number of other errors (the number of second errors in each of which the second phase has not been resolved and the number of first errors). In addition, when the job status screen 160 is displayed in steps S79 and S99, for each tab 162, the badge 170 on which the number of errors in each of which the first phase has not been resolved is described is overlapped with the corresponding tab 162 and displayed, and the badge 166 in which the number of other errors is described is overlapped with the corresponding tab 162 and displayed.

Figure 28:
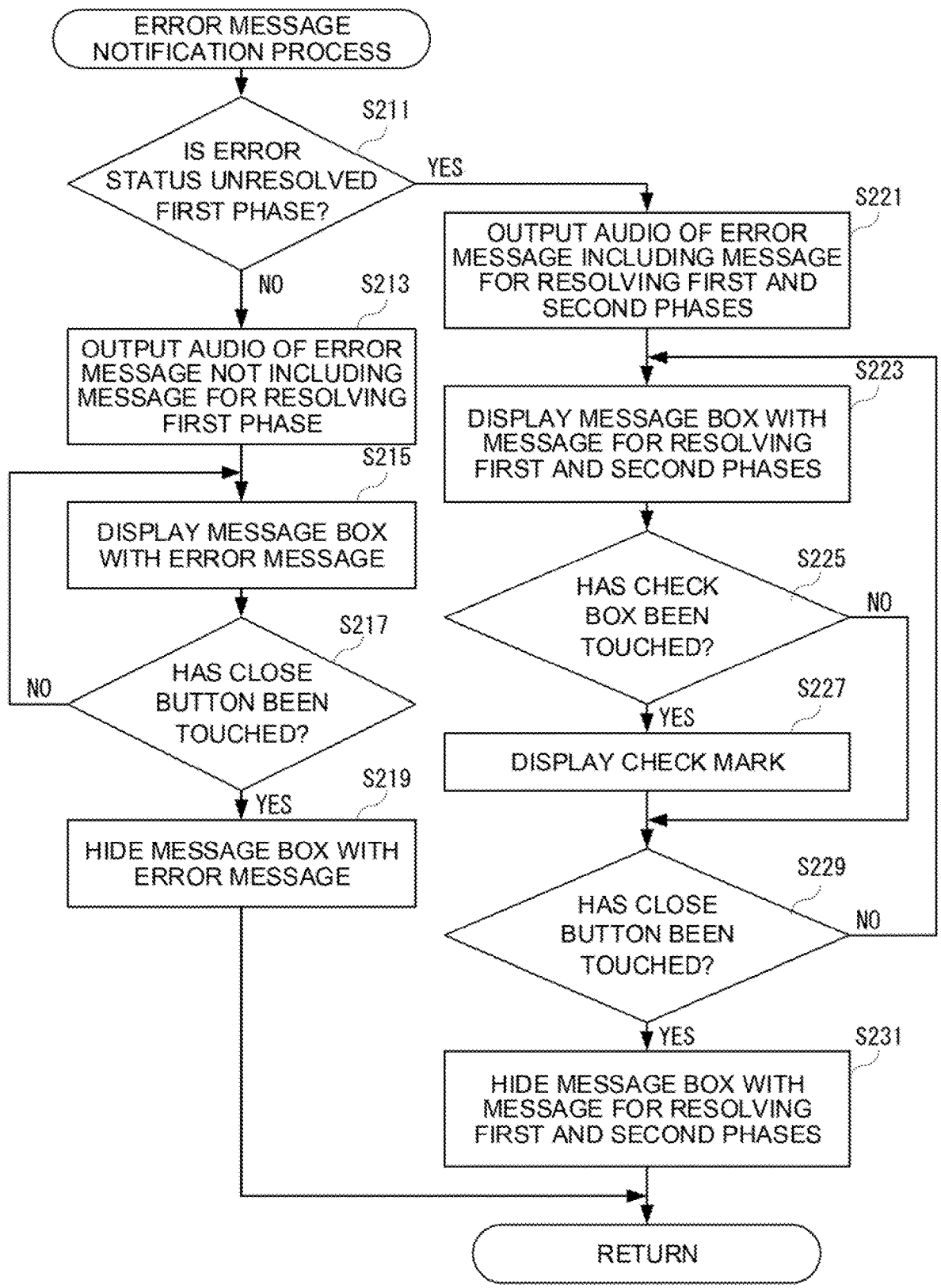
FIG. 28 is a flow diagram illustrating an example of an error message notification process of the CPU of the image forming apparatus according to the second embodiment.

FIG. 28 is a flow diagram illustrating an example of an error message notification process of the CPU 20 of the image forming apparatus 10 according to the second embodiment.

As illustrated in FIG. 28, when starting an error message notification process, the CPU 20 determines in step S211 whether the error status is unresolved first phase. If "NO" in step S211, that is, if the error status is not unresolved first phase, the audio of an error message that does not include a message for resolving the first phase is output in step S213, and the processes in steps S215 to S219 are executed. The error message notification process is ended and the processing is returned to the control process associated with the occurrence of an error or to the main control process.

Steps S215 to S219 are the same processes as steps S143 to S147 of the first embodiment. Therefore, the description of steps S215 to S219 is omitted.

If "YES" in step S211, that is, if the error status is unresolved first phase, the audio of an error message that includes a message for resolving the first and second phases is output in step S221, and the message box 120 in which a message for resolving the first and second phases is described is displayed on the display 32 in step S223.

In the following step S225, it is determined whether the check box 126 has been touched. If "NO" in step S225, that is, if the check box 126 has not been touched, the processing is advanced to step S229. If "YES" in step S225, that is, if the check box 126 has been touched, a check mark is displayed in the check box 126 in step S227, and the processing is advanced to step S229.

In step S229, it is determined whether the close button 124 has been touched. If "NO" in step S229, that is, if the close button 124 has not been touched, the processing is returned to step S223. If "YES" in step S229, that is, if the close button 124 has been touched, the message box 120 in which the error message for resolving the first and second phases is described is hidden in step S231. The error message notification process is ended, and the processing is returned to the control process associated with the occurrence of an error, the main control processes, or the message control process.

According to the second embodiment, the effect of the first embodiment is exhibited, and for the second error that is resolved in phases, display of the badges 106, 108, 166, and 170 can be controlled for each phase.

In addition, according to the second embodiment, for the second error, the error message and the resolution message can be re-notified in phases.

In the second embodiment, after the first phase is resolved, if an error message of an unresolved second phase is to be notified, an error message that does not include a message for resolving the first phase is notified. However, the present invention need not be limited to this. The error message of an unresolved second phase may include a message indicating that the first phase has been resolved. In such a case, in the example of the screen display illustrated in FIG. 20, for example, a message to contact a dealer and the display of the check box 126 may be changed to a message indicating that the purchase of the Y toner has been notified to the dealer (purchase procedure is completed). The same applies to the error message notification by audio.

The specific numerical values and screens illustrated in each of the above-described embodiments are merely examples, and can be appropriately changed in an actual product.

In addition, the flow diagrams illustrated in each of the above-described embodiments are merely examples, and the order of each step can be arbitrarily changed if the same effect can be obtained.

What is claimed is:
1. An image forming apparatus comprising:
an error information storage that stores, in a memory, error information on an error that has occurred;
a notifier that notifies an error message corresponding to the error;
a determiner that determines whether the error has been resolved;
an error information deleter that deletes, from the memory, error information on an error determined by the determiner to have been resolved;
a counter that counts a number of one or more unresolved errors determined by the determiner not to have been resolved;
a number displayer that visually displays the number of the one or more unresolved errors counted by the counter; and
a function selection screen displayer that displays a function selection screen which includes a function selection image for selecting one of a plurality of functions and allows selection of a function to use from among the plurality of functions,
wherein the error information storage stores the error information which includes information on a function at a time of occurrence that is a function having been selected when the error has occurred,
wherein the counter counts the number of the one or more unresolved errors for each function at the time of occurrence,
wherein
the number displayer displays the number of the one or more unresolved errors counted by the counter for each function at the time of occurrence in a badge that is placed in a vicinity of a corresponding function selection image or at least partially overlaps with the corresponding function selection image,
wherein the counter phasedly counts a number of one or more unresolved errors that are each to be resolved in phases, and
wherein the number displayer displays count numbers, which are obtained through phased counting by the counter, separately in badges equal in number to the phases, so as to make the count numbers distinguishable for each phase.

2. The image forming apparatus according to claim 1, wherein, when the function selection image, in the vicinity of which the badge with the number of the one or more unresolved errors displayed in the badge is placed or with which the badge with the number of the one or more unresolved errors displayed in the badge at least partially overlaps, is selected, the notifier re-notifies one or more error messages about the one or more unresolved errors.

3. The image forming apparatus according to claim 2, further comprising a notification selection screen displayer that displays a notification selection screen allowing selection of an error message to be re-notified by the notifier when the number of the one or more unresolved errors displayed in the badge, which is placed in the vicinity of the function selection image selected or at least partially overlaps with the function selection image selected, is two or more.

4. The image forming apparatus according to claim 1, further comprising a status confirmation screen displayer that displays a status confirmation screen which includes a process selection image for selecting one of a plurality of processes and allows a current status of one process selected from among the plurality of processes to be confirmed,
wherein the error information includes information on a process at a time of occurrence that is a process having been executed when the error has occurred,
wherein the counter counts the number of the one or more unresolved errors for each process at the time of occurrence, and
wherein the number displayer displays the number of the one or more unresolved errors counted by the counter for each process at the time of occurrence in a badge that is placed in a vicinity of a corresponding process selection image or at least partially overlaps with the corresponding process selection image.

5. The image forming apparatus according to claim 4, wherein, when the process selection image, in the vicinity of which the badge with the number of the one or more unresolved errors displayed in the badge is placed or with which the badge with the number of the one or more unresolved errors displayed in the badge at least partially overlaps, is selected, the notifier re-notifies one or more error messages about the one or more unresolved errors.

6. The image forming apparatus according to claim 5, further comprising a notification selection screen displayer that displays a notification selection screen allowing selection of an error message to be re-notified by the notifier when the number of the one or more unresolved errors displayed in the badge, which is placed in the vicinity of the process selection image selected or at least partially overlaps with the process selection image selected, is two or more.

7. The image forming apparatus according to claim 1, wherein the notifier notifies, about any of the one or more unresolved errors that are each to be resolved in the phases, an error message having a different content for each phase.

8. A non-transitory computer-readable recording medium storing a control program for controlling an image forming apparatus including an error information storage that stores, in a memory, error information on an error that has occurred, the control program causing a processor of the image forming apparatus to execute a method including:
notifying an error message corresponding to the error;
determining whether the error has been resolved;
deleting, from the memory, error information on an error determined to have been resolved during the determining;
counting a number of one or more unresolved errors determined not to have been resolved during the determining; and
visually displaying, on a display device, the number of the one or more unresolved errors counted during the counting, wherein the processor further:
displays, a function selection screen which includes a function selection image for selecting one of a plurality of functions and allows selection of a function to use from among the plurality of functions;
stores, the error information which includes information on a function at a time of occurrence that is a function having been selected when the error has occurred;
counts, the number of the one or more unresolved errors for each function at the time of occurrence:
displays the number of the one or more unresolved errors counted by the counter for each function at the time of occurrence in a badge that is placed in a vicinity of a corresponding function selection image or at least partially overlaps with the corresponding function selection image;
counts, a number of one or more unresolved errors that are each to be resolved in phases; and
displays, the count numbers, which are obtained through phased counting, separately in badges equal in number to the phases, so as to make the count numbers distinguishable for each phase.

9. A control method for controlling an image forming apparatus including an error information storage that stores, in a memory, error information on an error that has occurred, the control method comprising:
(a) notifying an error message corresponding to the error;
(b) determining whether the error has been resolved;
(c) deleting, from the memory, error information on an error determined to have been resolved during the (b);
(d) counting a number of one or more unresolved errors determined not to have been resolved during the (b); and
(e) visually displaying, on a display device, the number of the one or more unresolved errors counted during the (d);
(f) displaying, a function selection screen which includes a function selection image for selecting one of a plurality of functions and allows selection of a function to use from among the plurality of functions;
(g) storing, the error information which includes information on a function at a time of occurrence that is a function having been selected when the error has occurred;
(h) counting, the number of the one or more unresolved errors for each function at the time of occurrence;
(i) displaying the number of the one or more unresolved errors counted by the counter for each function at the time of occurrence in a badge that is placed in a vicinity of a corresponding function selection image or at least partially overlaps with the corresponding function selection image;
(j) counting phasedly, a number of one or more unresolved errors that are each to be resolved in phases; and
(k) displaying, the count numbers, which are obtained through phased counting, separately in badges equal in number to the phases, so as to make the count numbers distinguishable for each phase.

\* \* \* \* \*